(12) United States Patent
Raymond et al.

(10) Patent No.: US 10,279,617 B2
(45) Date of Patent: May 7, 2019

(54) LENS-BASED SECURITY FEATURES WITH MULTIPLE LENSES DEDICATED TO INDIVIDUAL COLORS FOR CURRENCY AND BRAND AUTHENTICATION

(71) Applicant: LUMENCO, LLC, Englewood, CO (US)

(72) Inventors: Mark A. Raymond, Littleton, CO (US); Hector Andres Porras Soto, Littleton, CO (US)

(73) Assignee: LUMENCO, LLC, Englewood, CO (US)

( * ) Notice: Subject to any disclaimer, the term of this patent is extended or adjusted under 35 U.S.C. 154(b) by 0 days.

(21) Appl. No.: 15/782,077

(22) Filed: Oct. 12, 2017

(65) Prior Publication Data

US 2018/0104974 A1    Apr. 19, 2018

Related U.S. Application Data

(60) Provisional application No. 62/408,122, filed on Oct. 14, 2016.

(51) Int. Cl.
*B42D 25/29* (2014.01)
*G02B 3/00* (2006.01)
(Continued)

(52) U.S. Cl.
CPC ............. *B42D 25/29* (2014.10); *B42D 25/21* (2014.10); *B42D 25/305* (2014.10);
(Continued)

(58) Field of Classification Search
CPC .... B24D 25/29; B42D 25/351; B42D 25/324; B42D 25/21; B42D 25/305; B42D 25/405; G02B 3/0037
(Continued)

(56) References Cited

U.S. PATENT DOCUMENTS

2015/0198749 A1*  7/2015  Ye .............................. G02B 5/18
                                                                     359/581
2016/0176221 A1*  6/2016  Holmes ................... B42D 25/29
                                                                     283/77

FOREIGN PATENT DOCUMENTS

| EP | 0330733 A1 | 9/1989 |
| WO | 2011138039 A1 | 10/2011 |
| WO | 2014041121 A1 | 3/2014 |

OTHER PUBLICATIONS

International Search Report for International Application No. PCT/US2017/056292, dated Mar. 22, 2018.

\* cited by examiner

*Primary Examiner* — Justin V Lewis
(74) *Attorney, Agent, or Firm* — Marsh Fischmann & Breyfogle LLP; Kent A. Lembke

(57) ABSTRACT

Products, such as branding labels, credit cards, and currency, that are fabricated so as to include an optical security element, which is designed to provide enhanced optical focusing onto each color used in the printed image (or in the ink layer). The optical security assembly may include a carrier film or substrate. An image element, e.g., a printed ink layer, is provided on a first surface of the carrier film/substrate, and the optical security assembly further includes an array or plurality of micro lenses on a second surface of the carrier film/substrate opposite the image element (when the substrate/carrier film is transparent). In order to make the registration and print requirements easier, pixels are isolated into sections of the printed ink layer, which can then be arranged to align with sets of lenses (i.e., each set/group of lenses may be dedicated to focusing upon a particular color of ink).

20 Claims, 22 Drawing Sheets

(51) Int. Cl.
*B42D 25/351* (2014.01)
*B42D 25/324* (2014.01)
*B42D 25/21* (2014.01)
*B42D 25/305* (2014.01)
*B42D 25/405* (2014.01)

(52) U.S. Cl.
CPC ......... *B42D 25/324* (2014.10); *B42D 25/351* (2014.10); *B42D 25/405* (2014.10); *G02B 3/0037* (2013.01); *G02B 3/0056* (2013.01)

(58) Field of Classification Search
USPC .................... 283/72, 74, 75, 77, 94, 98, 901
See application file for complete search history.

LENS-BASED SECURITY FEATURES WITH MULTIPLE LENSES DEDICATED TO INDIVIDUAL COLORS FOR CURRENCY AND BRAND AUTHENTICATION

CROSS-REFERENCE TO RELATED APPLICATIONS

This application claims the benefit of U.S. Provisional Application No. 62/408,122, filed Oct. 14, 2016, which is incorporated herein by reference in its entirety.

BACKGROUND

1. Field of the Description

This description is generally directed toward products such as polymer and other bank notes (or currency) with optical security features, and, more particularly, to a new configuration for an optical security element for products that provides high quality color imagery by addressing prior problems with registration during printing processes by using differing lens sets for each different, individual color to be printed in the ink layer (or image layer) positioned under a lens array in the optical security element.

2. Relevant Background

There are many products presently manufactured and distributed with optical security features so as to try to limit copying and counterfeiting. One of the most prevalent of these is currency of a country used daily in commerce. Other examples include tags or labels provided on clothing and other consumer items and credit and bank cards. It is desirable to provide optical security features to these and other products with minimal cost while also providing high levels of anti-counterfeiting protection. The anti-counterfeiting market is rapidly growing worldwide with anti-counterfeiting elements placed on a wide range of items such as upon currency (e.g., on a surface of a paper bill to help prevent copying) and on labels for retail products (e.g., labels on clothing showing authenticity).

With regard to protecting currency from copying, polymer bank notes or currency are made from a plastic or polymer such as biaxially oriented polypropylene (BOPP), blown propylene film, or the like. A growing number of countries are considering or even converting from paper to polymer bank notes, with at least eight countries having fully converted to polymer bank notes by 2014. Lower costs are one reason for this conversion as the polymer substrate or body of the bank note makes this currency more durable and longer lived. However, anti-counterfeiting is another key reason that many countries are converting to polymer bank notes.

Security features that are provided on paper can also be provided on polymer bank notes. Additionally, though, new security features that cannot be provided with paper currency can be provided with polymer bank notes because the substrate or body of the bank notes can be provided to be transparent (herein, "transparent" is intended to mean translucent to transparent to light). Hence, a transparent window may be provided that is used to display a security image that allows the bank note to be authenticated. An optical security feature may take the form of a lens or lens array (e.g., a lenticular lens array (linear lenses) or an array of round, hexagonal, aspherical, or other-shaped lenses) that is used to display an image printed on an opposite side of the transparent substrate (e.g., an interlaced image). The displayed or visible image may be a three dimensional (3D) image, an image that is animated with movement of the bank note (or with differing viewing angles), an image provided by a full volume pixel map or moiré pattern, and/or provide other optical effects available through the use of lenticular, diffraction, and other optical technologies.

With the use of such optical security features, polymer bank notes are very difficult to counterfeit as the optical security features cannot simply be copied using scanning, photocopying, and other techniques used with some paper bank notes. In many polymer bank notes, the security or anti-counterfeiting features are provided by a lens or lens array that is cast or embossed on the front or back of the bank note (or its transparent substrate or body) and by a corresponding image (e.g., a printed image visible through the lens or lens array, which may be considered the image element or component) provided on the reverse side of the bank note.

In any type of printed lens array (e.g., a lens array with linear, round, hex, aspheric, or other-shaped lenses paired with a printed ink or image layer) when multiple colors are used in the ink layer, all of the colors are printed under each lens. In other words, pixels (or printed dots) from an interlaced image used to create the print files or "plates" are provided under each lens of the lens array. FIG. 1 shows an exemplary optical security element 10 that includes a lenticular lens array 12 that focuses (as shown with arrows 13) light onto an ink layer 16 that is printed upon an opposite side 15 of a clear substrate 14 (or upon the back of the lens array 12 itself). In this conventional lenticular element 10, two or more colors are printed in the ink layer 16 underneath each lens, and this often leads to two colors being printed in the same position or with overlapping of the two (or more) colors of ink due to registration limitations of the printer or printing process. Hence, a viewer sometimes will see a lower quality color image with ghosting or other problems as the lenses 12 focus 13 upon two or more colors from viewing angles.

The registration requirements during printing increase dramatically as the pitch or frequency of the lenses increase. In other words, printing a linear lens at 75 LPI (lenses per inch) in a 4-color process is difficult but is far easier than a pixel-mapped round lens in multiple colors at 1,200 lenses per inch in two axes. The registration requirements for multiple colors under one lens can be as difficult as having a registration tolerance of less than 1 micron in two axes to get the proper frames in the proper colors back to the viewer. In web and sheet-fed printing processes, movements of 30 to 300 microns are common and often within specification of the manufacturer of the equipment.

Since in traditional lens technologies all of the colors in the image must be printed under each individual lens for the image to work properly to the viewer, these tolerances are very small. For instance, in a 75 LPI lens that has a focal length of about $18/1000$-inch, a normal print resolution of about 2400 DPI (dots per inch) is used. The width of the lens is about 0.0133 inches. For a typical image to be printed, this is divided into about 8 segments or equal to 0.001666 inches per image frame. For this to work to the viewer for proper viewing, these image frames in a linear lens are generally printed in a 4-color process or can be individual colors (e.g., a CMYK color model used in color printing using four inks of cyan, magenta, yellow, and key (or black)). This means that each of the images must register to within about the amount of each image frame under each lens. While this can be done with traditional sheet-fed equipment, the dynamics get far more difficult as the lenses get smaller. Further, the registration requirements are not just in one axis, but, instead, they are in two axes (both X and Y or side to side and up and down).

One specific example is that a security thread for currency may have 1,200 lenses per inch or be about 21μ in diameter. In order to create a 3D or animated image, the number of image frames may be about 10 frames in two axes to achieve this. This equates to about a 2μ image frame. In order to make an image work and in multiple colors for a viewer, the registration requirements are about 0.5μ or less, which is impossible with any known processes.

Hence, there remains a need for new designs of optical security elements that make the registration requirements more forgiving, especially for thin security films and lenses that are not linear such as round, square, hexagonal and aspheric lenses used in many optical security elements.

SUMMARY

Briefly, a lens-based display apparatus or assembly is described herein that is useful as an optical security element. The display apparatus includes a lens array with a first side comprising a plurality of lenses and a second side opposite the first side. The display apparatus also includes a printed image (or ink layer) proximate to the second side of the lens array, and the printed image/ink layer includes a first set of pixels formed with ink of a first color and a second set of pixels formed with ink of a second color. In the apparatus, lenses are dedicated for use in focusing on only one color. With this in mind, the first set of pixels are located underneath a first set of the lenses of the lens array, and the second set of pixels are located underneath a second set of the lenses of the lens array that differs from the first set of the lenses.

In some embodiments of the display apparatus, the first set of pixels are located at locations under each of the lenses in the first set of the lenses that differ from locations of the second set of pixels under each of the lenses in the second set of the lenses (and vice versa). Hence, no color data (unless due to registration error/variance causing overlaps) for the image associated with the second color is provided under the first set of lenses and vice versa. Specifically, the first set of the lenses are focused on data-absent or blank pixels of the printed image when the second set of the lenses are focused on the second set of pixels (and vice versa).

The first set of pixels are located in a first set of sections (or areas or boxes) and the second set of pixels are located in a second set of sections. In this regard, the first and second sets of sections are arranged in first and second patterns that differ and that are configured to position each of the first set of sections under a subset of the first set of the lenses and each of the second set of section under a subset of the second set of the lenses. The first and second patterns are generally chosen to arrange the sections associated with the two differing colors in a checkboard or chessboard arrangement to provide an equal number of each and to provide equal spacing in the printing image to provide a relatively equal and well-distributed number of pixels for creating images with both colors of pixels. In practice, each of the subsets of the first and second sets of the lenses may include a non-integer number of the lenses (to limit visual artifacts like ghosting).

Further, the first set of sections may be a subset of sections formed by dividing a plate formed from an interlaced image for the first color by a color separation process into a grid, and the second set of sections may be a subset of sections formed by dividing a plate formed from the interlaced image for the second color by the color separation process into the grid. Additionally, the sections have sides with dimensions chosen such that a color set formed of two of the sections is greater in size than a registration error of a printer used to form the ink layer. For example, the dimensions of the sides (width and height) may be greater than four times the registration error.

In many embodiments, the apparatus also includes a substrate, and the ink layer is printed upon a surface of the substrate and the substrate is mated with the lens array. In these and other embodiments, the lenses each may be a linear lens, a round lens, an aspherical lens, a square lens, or a hexagonal lens. The apparatus typically will be included in or formed upon some product, and the product may be currency, a credit card, a patch, a passport, an authenticity label, or the like.

In other embodiments, it may be useful to provide an ink layer or printed image that is a checkboard or other pattern of solid colored blocks rather than trying to print each pixel and such a colored block layer may be combined with a mask formed using some of the color separation techniques discussed above. More specifically, a lens-based display apparatus can be provided that is useful as an optical security element. The apparatus includes a lens array with a first side including a plurality of lenses and a second side opposite the first side, and the apparatus may also include a printed image including blocks formed of ink of a first color and arranged in a first pattern and blocks formed of ink of a second color and arranged in a second pattern differing from the first pattern. Further, the apparatus can include a mask proximate to the second side of the lens array and positioned between the printed image and the lens array. The mask includes a first set of openings associated with a first set of pixels and a second set of openings associated with a second set of pixels. Also, the first set of openings are arranged into a first set of sections that are arranged in a third pattern matching the first pattern of the blocks. Further, the second set of openings are arranged into a second set of sections that are arranged in a fourth pattern matching the second pattern of the blocks, and the first set of openings are located underneath a first set of the lenses of the lens array. Additionally, wherein the second set of openings are located underneath a second set of the lenses of the lens array that differs from the first set of the lenses.

In some implementations, the first set of pixels corresponds with a subset of pixels of a first color plate for an interlaced image and the second set of pixels corresponds with a subset of pixels of a second color plate for the interlaced image. In such cases, the interlaced image may be a full color image. Then, the mask may include third and fourth sets of openings associated with third and fourth sets of pixels from third and fourth color plates for the interlaced image, and the printed image further may include blocks formed of ink of a third color and arranged in a third pattern and blocks formed of ink of a fourth color and arranged in a fourth pattern differing from the first, second, and third patterns.

In the same or other cases, the apparatus may also include a substrate. Then, the ink layer abuts a surface of the substrate, the substrate is mated with the lens array, and the mask is disposed between the ink layer and the lens array. This allows a product to be formed such as currency, a financial card, a patch, a passport, and an authenticity label. It may be useful for the first and second patterns to be selected such that the blocks of the first and second colors of ink are arranged in a checkboard pattern. The mask can be formed by demetallization of a metalized film to form the openings.

According to another aspect of the description, a method is provided for fabricating a lens-based display assembly. The method includes: (a) using color separation to generate a plate for each of at least two colors from a digital interlaced image, each of the plates including a set of digital data defining a number and a location of pixels of a particular color; (b) dividing each of the plates into a plurality of equally sized sections; (c) identifying a subset of the sections from each of the plates, with a different pattern being used to identify each of the subsets of the sections and with the different patterns being configured such that there are no co-located ones of the sections; (d) generating a combination plate including all of the subsets of the sections of the at least two colors; (e) processing the combination plate to form a file defining a mask with openings at the locations of the pixels in the subsets of the sections and with opaque areas at locations in the combination plate free of the pixels in the subsets of the sections; (f) forming a mask using the file defining the mask; (g) forming a printed image using a different color of ink to print a color block that is matched in size and location with the subsets of the sections; and (h) mating the mask and the printed image with a lens array, with each of the color blocks in the printed image positioned underneath a differing subset of lenses of the lens array.

According to some embodiments of this method, the different patterns used to identify each of the subsets of the sections are configured such that the subset of sections in the combination plate have a checkerboard arrangement. The forming steps and the mating step can be performed such that the mask is sandwiched between the printed image and the lens array. The lens array may be a sheet of transparent material with a plurality of linear lenses, round lenses, aspherical lenses, square lenses, or hexagonal lenses (e.g., micro lenses with any of these configurations).

DETAILED DESCRIPTION

Figure 1:
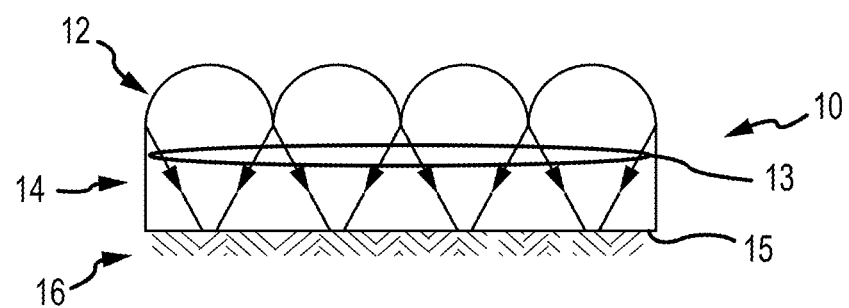
FIG. 1 illustrates a schematic side view (or functional block drawing) of a conventional optical security element with an ink layer providing two or more colors of ink (e.g., two or more colored stripes or pixels/dots) under the lenses of a lens array.

Briefly, the present description is directed toward products, such as branding labels, credit/debit/bank cards, and polymer bank notes, that are fabricated so as to include an optical security element (or feature or assembly), which is designed to provide enhanced optical focusing onto each color used in the printed image (or in the ink layer).

The optical security assembly may include a carrier film or substrate (transparent product body, in some cases, while other embodiments have an opaque substrate such as a paper layer). An image element, e.g., a printed ink layer, is provided on a first surface of the carrier film/substrate, and the optical security assembly further includes an array or plurality of micro lenses on a second surface of the carrier film/substrate opposite the image element (when the substrate/carrier film is transparent). The micro lenses are provided in an optical material layer deposited upon the second surface, and the lenses and the film/focusing substrate of the deposited optical material may be thought of as a "focusing element." As discussed above, the inventors recognized that printing multiple colors can be difficult due to registration errors or variances between processes of printing each color. For example, some printers or printing processes may have a registration error/variance in the range of 10 to 40 microns, with 20 microns being common for many commercially available printers.

In order to make the registration and print requirements easier, pixels can be isolated into sections or portions of the printed ink layer/printed image, which can then be arranged to align with or be located underneath predefined groups or sets of lenses (i.e., each set/group of lenses may be dedicated to focusing upon a particular color of ink) rather than having all of the colors under each lens. The resulting registration requirements are far less stringent, and the colors physically print better and are more clear (not on top of each other) when viewed through the lenses of the lens array of the optical security element.

However, it is not a simple task to modify and/or reorganize the pixels for the print files. First, the inventors determined that one solution to the print registration problem is that one can use multiple lenses (or a lens set) dedicated to one color and get the information back to the viewer. However, this should be done in an organized way while mapping the images. Second, the inventors determined that providing only one color under a lens is facilitated by the absence of data for the other colors in each of the lenses dedicated to just one color (e.g., a lens used to provide yellow would not have pixels of cyan underneath it in the ink layer). The pixels of the print files are organized under (or mapped to) the lenses so that only the data from a specific color appears under that lens set, and the other data is missing. It is also important that the data appear in the exact desired position relative to that data for each lens used to provide that color in the image viewed through or produced by a lens array. Conversely, the data for the other colors also contain data only from that lens set (or only pixels for that color) and are in the proper position under those lens sets.

In one preferred embodiment, exact numbers of lenses corresponding to colors are not beneficial in displaying each section/portion of a particular color, as it creates some unwanted visual patterns such as banding in the displayed/viewed image. The inventors recognized that it is far better to have a fractional number of lenses in both axes for each section/portion (say 4.5 rows and 4.5 columns or 4.5 rows and 5.5 columns) rather than even numbers (e.g., rather than 4 lenses in each row and column to provide 16 lenses or 4 lenses in the rows and 5 lenses in the columns to provide 20 lenses). A mis-registration between the colors may still be visible to the viewer with the new process as some color overlap will still be present (such as less than about 30 percent such as less than 20 percent and preferably less than 10 percent), but it is not nearly as sensitive as the traditional method of having all of the colors under the same lenses. Also, the colors tend to be more pure and clean as there is no (or at least less) overlap in the dots or pixels (as 70 percent or more of each section/portion of the printed image is focused as clean or non-overlapping pixels).

It is important to note that the data space occupied under each lens set (color set) cannot be common to both colors relative to the lens itself, or the colors will be on top of each other (as will the images). With regard to mapping or interlacing the images for printing, the inventors understood that traditional interlacing software by itself or without modification will not work for this type of mapping or interlacing. New software (or modified software) was developed for removing data associated with other colors from each of the lenses, and the printing method and resulting new optical security element are described in detail following discussion of FIGS. 2 and 3.

Figure 2:
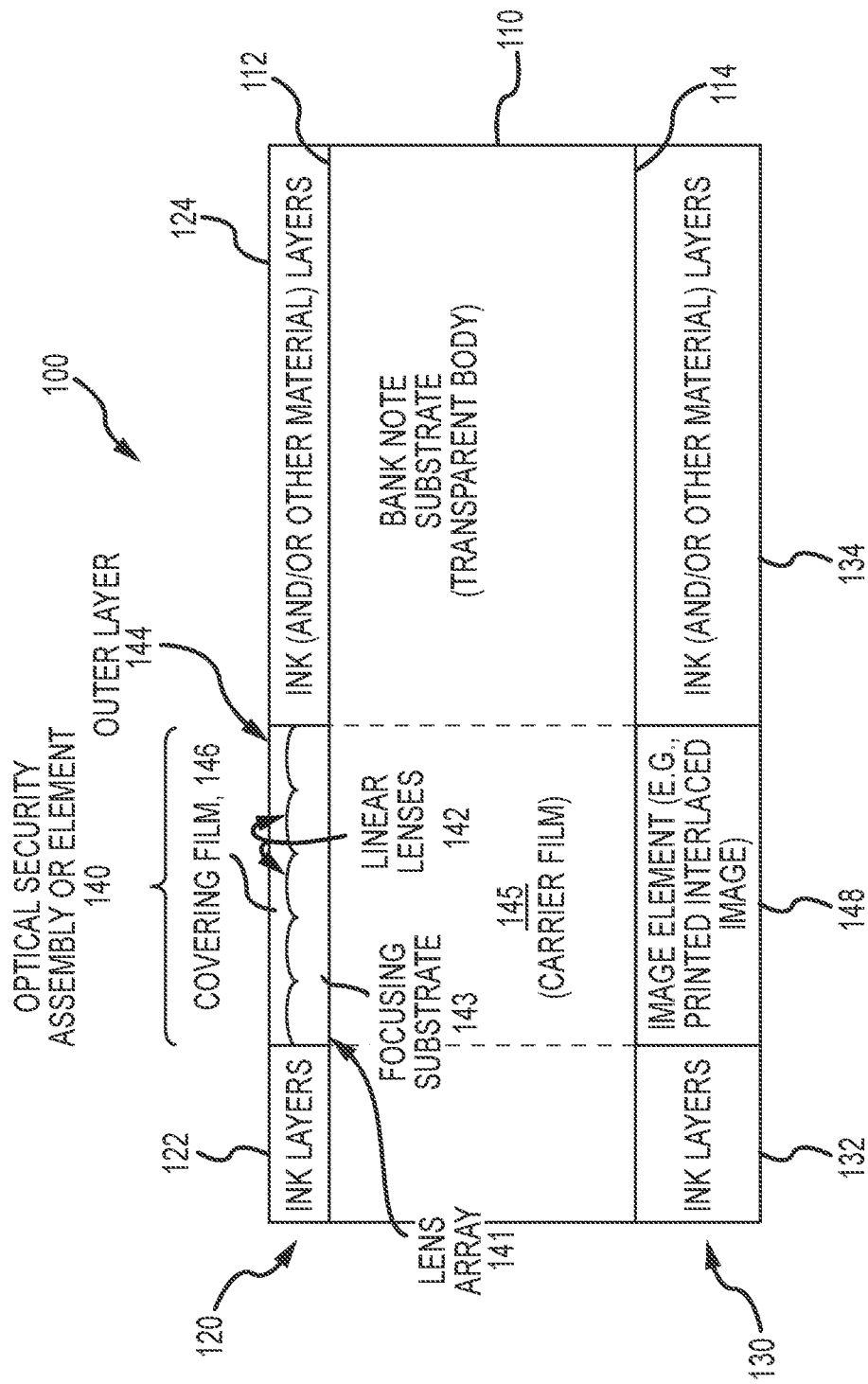
FIG. 2 illustrates a schematic side view (or functional block drawing) of a product or item (such as product branding label, a credit/debit card, a polymer bank note, or the like) including an optical security element (or feature or assembly) of the present description.

Many products or items may be fabricated to include an optical security element or assembly of the present description, but it may be useful to illustrate one particular product to show one intended and beneficial use. FIG. 2 illustrates schematically (or with a functional block-type drawing) a polymer bank note 100 of the present description. The bank note 100 is "polymer" in that it includes a body or substrate 110 that is formed of a transparent (e.g., translucent to transparent to light) plastic or polymer such as, but not limited to, a polypropylene such as biaxially oriented polypropylene (BOPP). The note substrate 110 is formed from a thin sheet of the polymer or plastic such that the body is planar with first and second opposite sides or surfaces 112, 114, with many countries having currency that is rectangular in shape that is 2 to 3 inches in width by 4 to 6 inches in length. The substrate 110 is "thin" in that it typically will have a thickness (as measured between sides/surfaces 112 and 114) of about 70 to 85 microns with 75 microns being a common thickness for the transparent substrate 110.

The bank note 100 further includes materials including layers of ink and other compounds to provide imagery and information associated with the currency definition or design for the country. As shown, the note 100 includes an upper currency image stack 120 and a lower currency image stack 130 that are used to display imagery and data associated with the front and back of a particular currency run, e.g., the imagery may differ for each denomination of a country's currency and the imagery may be updated periodically (such as to show a different country leader's image). The upper currency image stack 120 is shown to include first and second sets of ink (and/or other material) layers 122 and 124, and, likewise, the lower currency image stack 130 is shown to include first and second sets of ink (and/or other material) layers 132 and 134. The layers 122, 124, 132, 134 may include a base layer (e.g., a layer of white ink) followed by several other layers to print differing colors of an image.

The techniques for applying the image stacks 120, 130 are well known in the currency industry and, hence, are not explained in detail herein. For this description, it is more relevant that the ink layers 122, 124, 132, 134 increase the overall thickness of the bank note, and this build up thickness can be used to provide a focusing element 141 on one side 112 of the note substrate 110 and an image element (e.g., layers of ink providing a printed interlaced image or other imagery) 148 on the opposite or second side 114 of the substrate 110 without bumps or bulges that could negatively affect later use and processing of the bank note 100 and without an exposed profile/surface that could readily be copied/counterfeited. For example, the thickness of the ink layers 122, 124 (and also ink layers 132, 134) may be in the range of 7 to 25 microns with a thickness in the range of 10 to 20 microns and, in some cases, 12 to 18 microns being common in polymer bank notes presently in production.

In some useful but not limiting embodiments, it is desirable to design the bank note 100 such that any security features (including that of the optical security assembly or element 140) are provided without increasing the overall thickness of the note 100 and without providing a bulge or bump at the location of any of the security features. To this end, the bank note 100 is shown to include an optical security element or assembly 140 that is adapted, at least in this non-limiting example, to have an overall thickness that matches or is less than the overall thickness of the note 100 (e.g., thickness of the substrate 110 and ink layers 120, 130).

Figure 3:
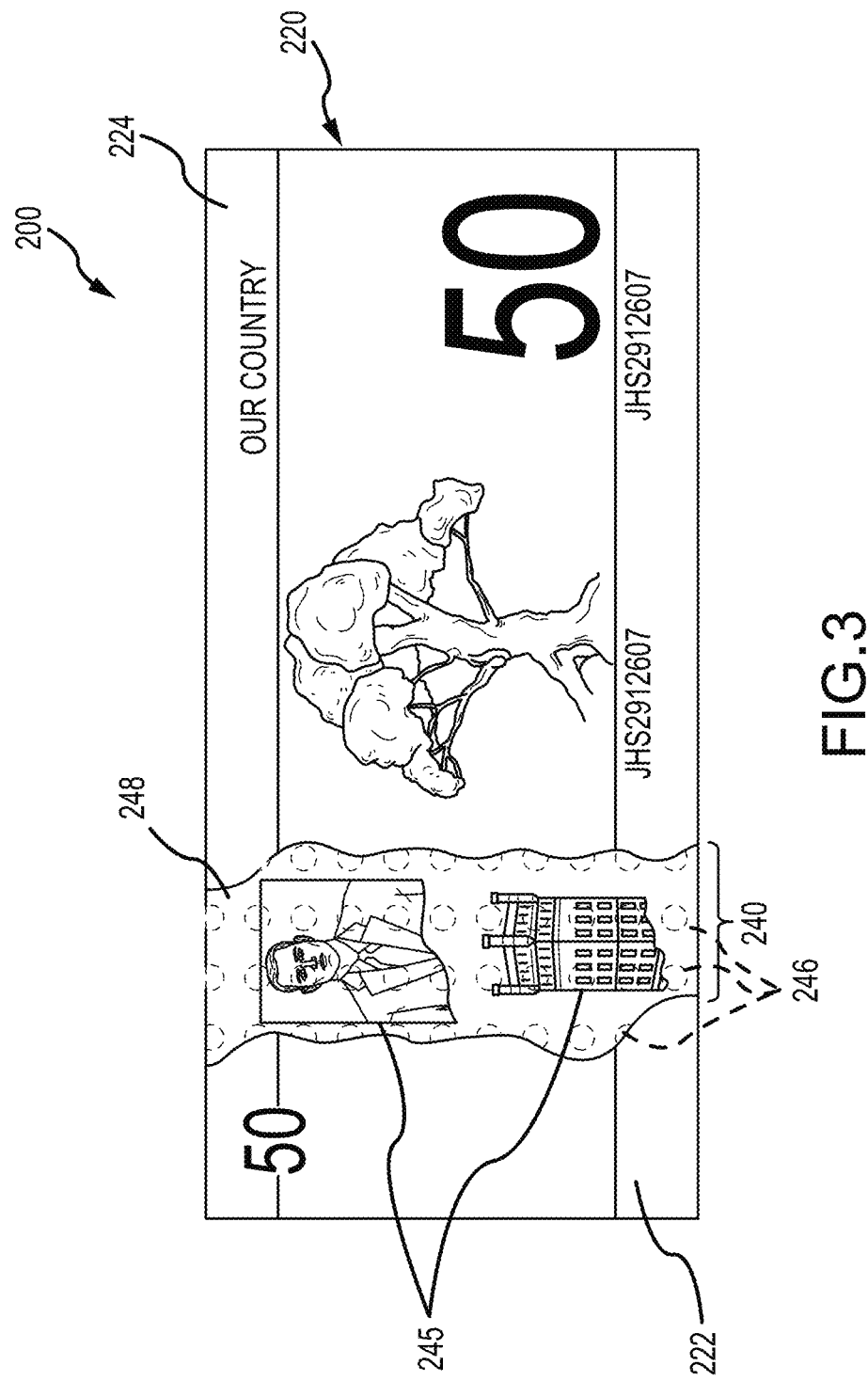
FIG. 3 is a top view of a polymer bank note with an optical security assembly of the present description similar to that provided/shown in the product of FIG. 2 but with an array of circular or round lenses rather than linear or elongated lenses as shown in FIG. 2.

The optical security assembly 140 includes a focusing element or lenticular lens array 141 attached to, or, more typically, formed upon the first or upper side (or surface) 112 of the note substrate 110. In some cases, the focusing element 141 is cast or formed of the same material as the substrate 110, such as a transparent plastic or polymer (e.g., polypropylene or the like), but, in other cases, it is desirable to use a lower index of refraction material (relative to substrate 110) and the focusing element 141 is deposited such as with ultraviolet (UV) casting onto surface 112 of the substrate 110. The focusing element 141 is made up of a plurality of linear lenses 142 (on a focusing substrate 143) such as concave lenticules, as shown in FIG. 2, that may have a circular, elliptical, hexagonal, square, or other cross-sectional shape or arrays of micro lenses with circular, hexagonal, square, or other bases may instead be utilized as shown in FIG. 3.

The optical security assembly 140 further includes an outer layer 144 including a plurality of fillers or fill portions (or covering film) 146, which are formed by applying material over the concave focusing element 141 so as to fill in and/or protect the lenses 142. In some embodiments, the outer layer 144 and its covering film 146 is eliminated or left off the optical security element 140, but in many cases, it may be desirable to provide material over the lenses 142 to provide a covering film 146 with an outer/exterior surface that is flat or planar and that is level or about level with the outer/exterior surfaces of the ink stacks 122, 124 (or ink layer 120) to avoid bumps or dips in the note 100 where the optical security element 140 is provided. The outer layer 144 may be formed of a transparent material such as a polypropylene with similar optical characteristics including an index of refraction as that of the focusing element 141 and/or the substrate 110. However, the outer layer 144 may also be provided with material having a higher index of refraction than the focusing element 141.

The optical security assembly 140 also includes an image element 148, which may be a layer of ink providing a printed interlaced image such as by interlacing of images corresponding with the concave lenticules/lenses 142 of concave focusing element 141, and the image element 148 is provided on the second or lower side 114 opposite the lenses 142. Significantly, the image element or ink layer 148 is printed using the techniques described herein such that different sets of the lenses 142 are paired with sections or portions of the ink layer 148 printed in differently colored inks. Hence, a first set of lenses 142 is aligned with or registered with the location of a first set of sections/portions of the interlaced image that are printed in a first color while a second set of lenses 142 is aligned with or registered with the location of a second set of sections/portions of the interlaced image that are printed in a second color (and so on for each additional color of ink used in the printed image element/ink layer 148).

The optical security element or assembly 140 further is shown to include a portion or segment 145 of the substrate 110 (e.g., a carrier film) that is sandwiched or positioned between the lenses 142 of the focusing element 141 and the image element 148. The lenses 142 of the focusing element 141 are configured (as discussed below) so as to focus through the substrate portion or carrier film 145 onto the back or second side 114 and the image element 148 provided there (or slightly in front of or behind the image element 148). The focusing element 141 is shown to be positioned in the gap or space between the ink layers 122 and the ink layers 124 while the image element 148 is positioned in the gap or space between the ink layers 132 and the ink layers 134, with portions of the image element (such as a slice or stripe of an interlaced image) 148 being aligned or registered with one (or more) of the lenses 142 of the concave focusing element 141.

Note, the bank note 110 may also be provided with a paper substrate for carrier film 145, and, in such an embodiment, the image element 148 would be printed on an upper surface of the carrier film/paper substrate 145 to be adjacent to the lens array 141 in the optical security element 140. Further, it should be understood that some preferred embodiments will include a mask as part of the image element 148, and, in these embodiments, the mask would be provided on the back or second side 114 of the carrier film 145 with the ink blocks of color/ink layer being provided on the mask (e.g., such that the mask is sandwiched between the micro lenses and the ink layer/ink blocks of color). Also, in a paper substrate embodiment, the mask would be provided between the lens array and the ink layer/color blocks, which may be printed on the paper substrate.

FIG. 3 illustrates a top view of an exemplary polymer bank note 200 fabricated according to the present description with an optical security element or assembly 240 that provides focusing through the use of lenses 246 of a focusing element. The bank note 200 includes an optical security assembly 240 with an array or plurality of round lenses 246 that are, optionally, covered and/or filled in by an outer layer 248 of transparent material (e.g., material with the same or, more typically, a higher index of refraction than the material providing the lenses 246). In this embodiment of note 200, the lenses 246 are round-based lenses arranged in an array of rows and columns rather than the linear lenses 142 of FIG. 2, and the number typically will be much larger than shown with large diameter lenses 246 being shown for simplicity in illustration. Other base shapes may be used, and the lenses 246 may be arranged in a more random pattern and/or may have their chords contacting each other or adjacent lenses 246 instead of being spaced apart as shown.

The lenses 246 are used to focus light passing through the material of the focusing element and cover/outer layer 248 so as to display images 245 (e.g., 3D images, images with motion, and the like), which are provided via an image element/printed ink on the back or opposite surface of the note 200 and that allow a viewer to verify the authenticity of the bank note 200. As shown in FIG. 2, the bank note 200 includes a first or upper image stack or assembly 220 made up of a first set of ink (and/or other material) layers 222 and a second set of ink (and/or other material) layers 224. A gap or space is provided between the two sets of layers 222, 224, with the optical security assembly 240 with its lenses 246 and outer layer 248 positioned between the two sets of layers 222, 224. The two images 245 produced may be of two different colors, and the image element/printed layer is printed so that portions/sections associated with the first-colored image are under a first set of lenses 246 with portions/sections associated with the second-colored image under a second set of lenses 246 (that differs from the first set of lenses 246 such that lenses are dedicated to focusing on pixels/dots associated with a particular, single color).

Figure 4A:
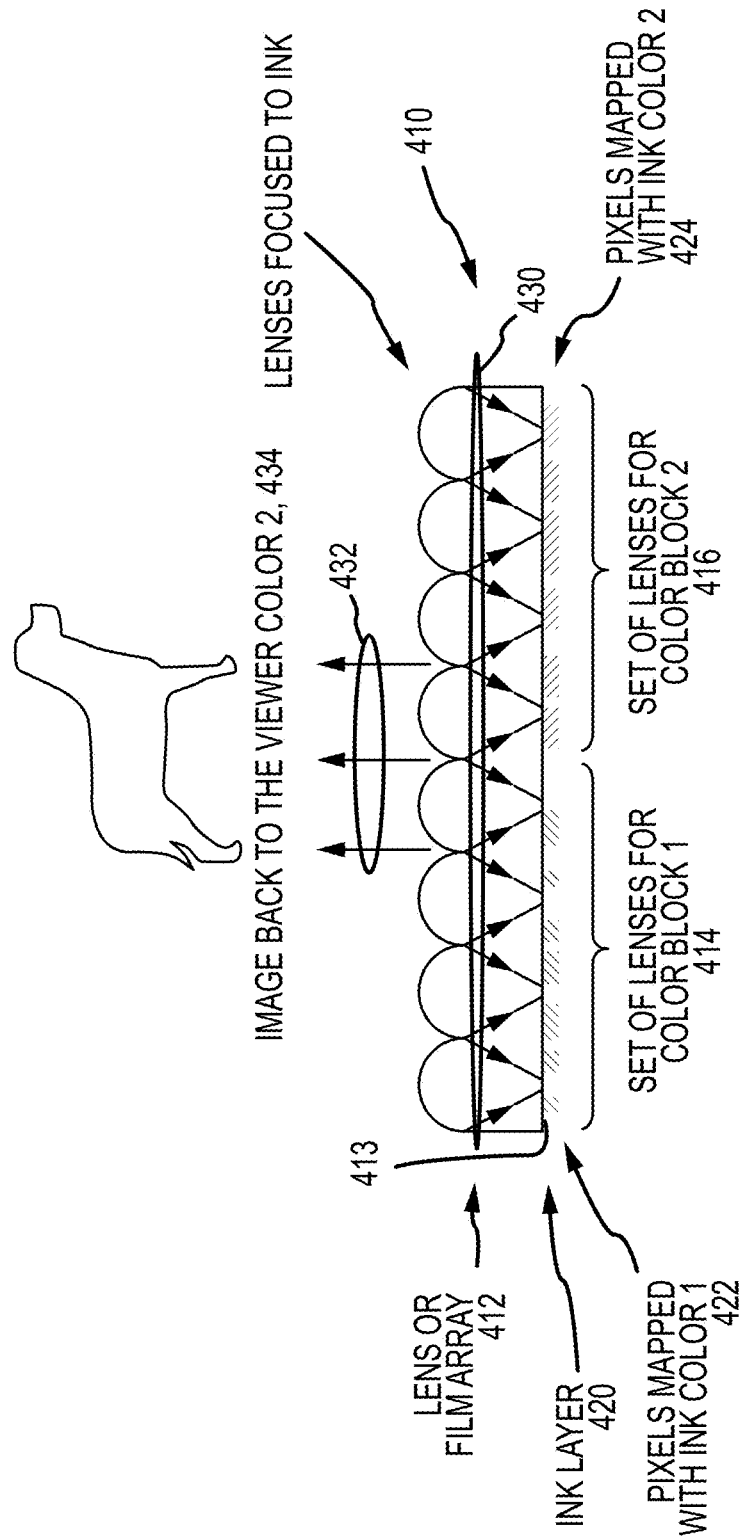
FIGS. 4A and 4B illustrate a schematic (or functional) side view of an optical security element (or feature or assembly) that may be used in a wide variety of products such as currency, product labels, credit cards, and the like to provide two images of differing color.
Figure 4B:
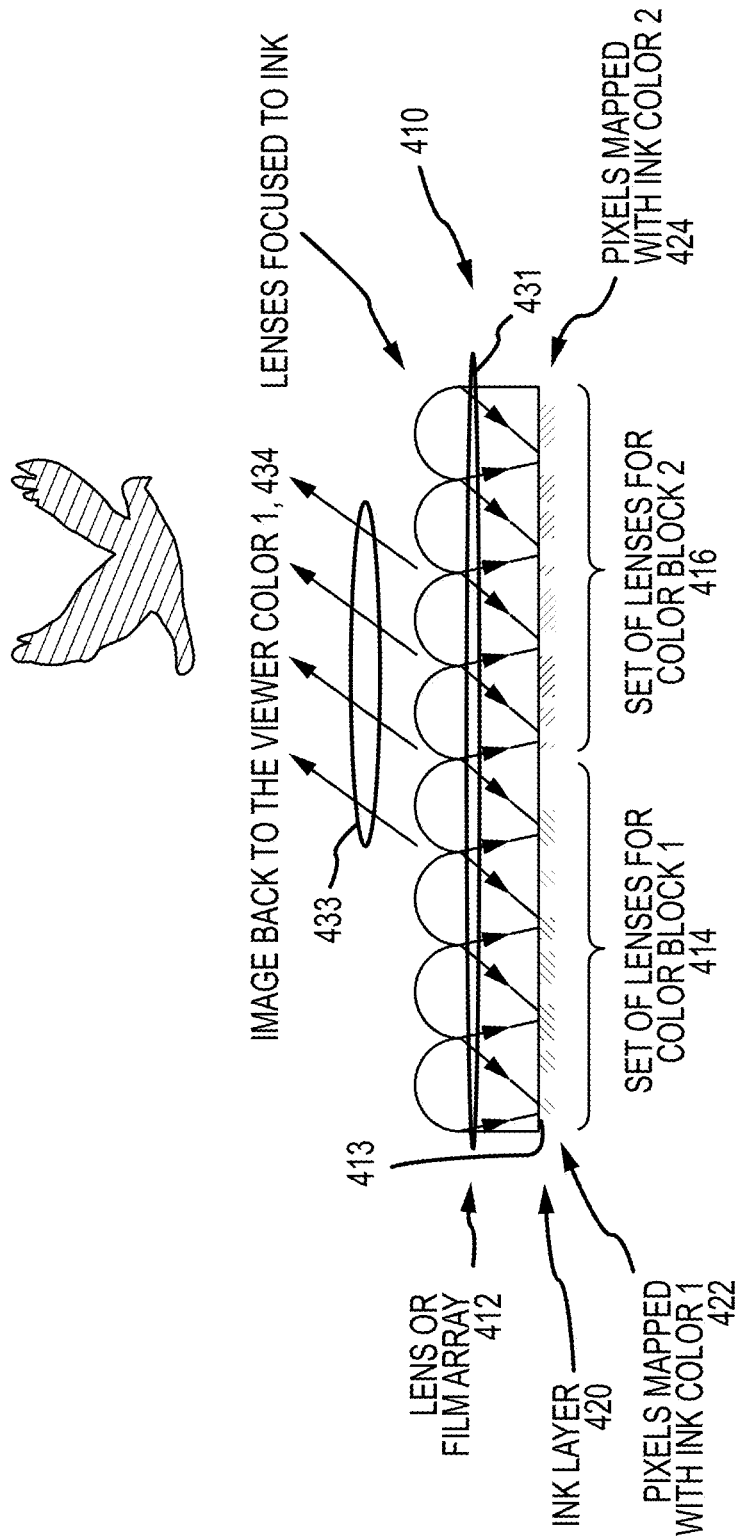

FIGS. 4A and 4B illustrate a schematic (or functional) side view of an optical security element (or feature or assembly) 410 that may be used in a wide variety of products such as currency, product labels, credit cards, and the like to provide two images of two different colors (with it being understood that any two images/frames may be presented using this way including two or more colors of the same multi-colored image). The feature 410 is adapted for providing a simultaneous image flip and color flip effect. In FIG. 4A, a viewer's eyes are positioned relative to the security element 410 (at a first point of view (POV)) to view a first image 434 via reflected light 432 of a second color (e.g., cyan) while, in FIG. 4B, a viewer's eyes are position relative to the security element 410 (at a second point of view (POV) differing from the first POV) to view a second image 435 via reflected light 433 of a first color (e.g., magenta). Significantly, the optical security element has an ink layer 420 configured to map sections/portions of the images (or its pixels) to differing sets of lens such that these sets of lenses only (or mostly (such as 70 percent or more)) focus on one color.

As shown, the security element (or more generally lens-based display element) 410 includes a lens array or film 412 that may be made up of a plurality of lenses of any of the shapes described herein. An image or ink layer 420 is provided on (or adjacent) an opposite or back side 413 of the lens array or film 412, and the ink layer 420 may be printed directly upon the lens array surface 412 or upon a substrate that is then positioned adjacent (e.g., abutting) the lens array surface 412. The ink layer or printed image 420 is divided up into a first set of sections or portions that are each to be printed in a first color (i.e., their pixels are printed in that first color) and a second set of sections or portions that are each to be printed in a second color (i.e., their pixels are printed in that second color). This is represented in FIGS. 4A and 4B with pixels 422 mapped to ink of a first color and pixels 424 mapped to ink of a second color.

Upon assembly, the first set of pixels 422 is paired with a set of lenses 414 selected for focusing on pixels of the first color (lenses 414 are focusing on blank sections in FIG. 4A), and the second set of pixels 424 is paired with a set of lenses 416 selected for focusing on pixels of the second color (lenses 416 are focusing on pixels of the second color). When only two colors are used, the sections/portions of pixels mapped to each color 422, 424 may be printed in a checkerboard manner with the sections of the two different colors being alternated in rows and then offset in columns like a common checkerboard (or chessboard) to evenly distribute the pixels between the colors (and images 434, 435 associated with each of the pixels colors). Hence, the sets of lenses used to focus on each the differing color sections/portions will also be arranged in a checkboard/chessboard manner over the ink layer 420 (i.e., over the pixels 422, 424 mapped to each color).

As shown in FIG. 4A, the POV of the viewer is such that the lenses in the array 412 are being used to only (or mainly such as 70 percent of the light 432) to reflect light 432 associated with the pixels of an image 434 of the second color. The pixels 424 in the image/ink layer 420 that are associated with this image 434 and are printed in the second color are located underneath (or are mapped to and aligned with) the set of lenses 416 designated for focusing 430 on the pixels 424 of this second color. In FIG. 4A, it can be seen that the focusing 430 is upon the pixels 424 mapped to the second color and not upon the pixels 422 mapped to the first color. This is achieved in part by providing no ink/coloring of pixels in the section/portion of the ink layer/printed image 420 associated with the first color, which can be seen by the focusing 430 by the set of lenses 414 associated with the first color being on blank or no data pixels in the pixel set 422.

Then, as shown in FIG. 4B, the POV of the viewer is such that the lenses of the array 412 are being used to only (or mainly) to reflect light 433 associated with the pixels of an image 435 of the first color. The pixels 422 in the image/ink layer 420 that are associated with this image 435 and are printed with ink of the first color and are located underneath the set of lenses 414 designated for focusing 431 on the pixels 422 of this first color (lenses 414 are focusing on pixels of the first color). In FIG. 4B, it can be seen that the focusing 431 is upon the pixels 422 mapped to the first color and not upon the pixels 424 mapped to (or printed in) the second color (lenses 416 are focusing on blank sections). This is achieved in part by providing no ink/coloring of pixels in the section/portion of the ink layer/printed image 420 associated with the second color, which can be seen by the focusing 431 by the set of lenses 416 associated with the second color being on blank or no data pixels in the pixel set 424.

Figure 5:
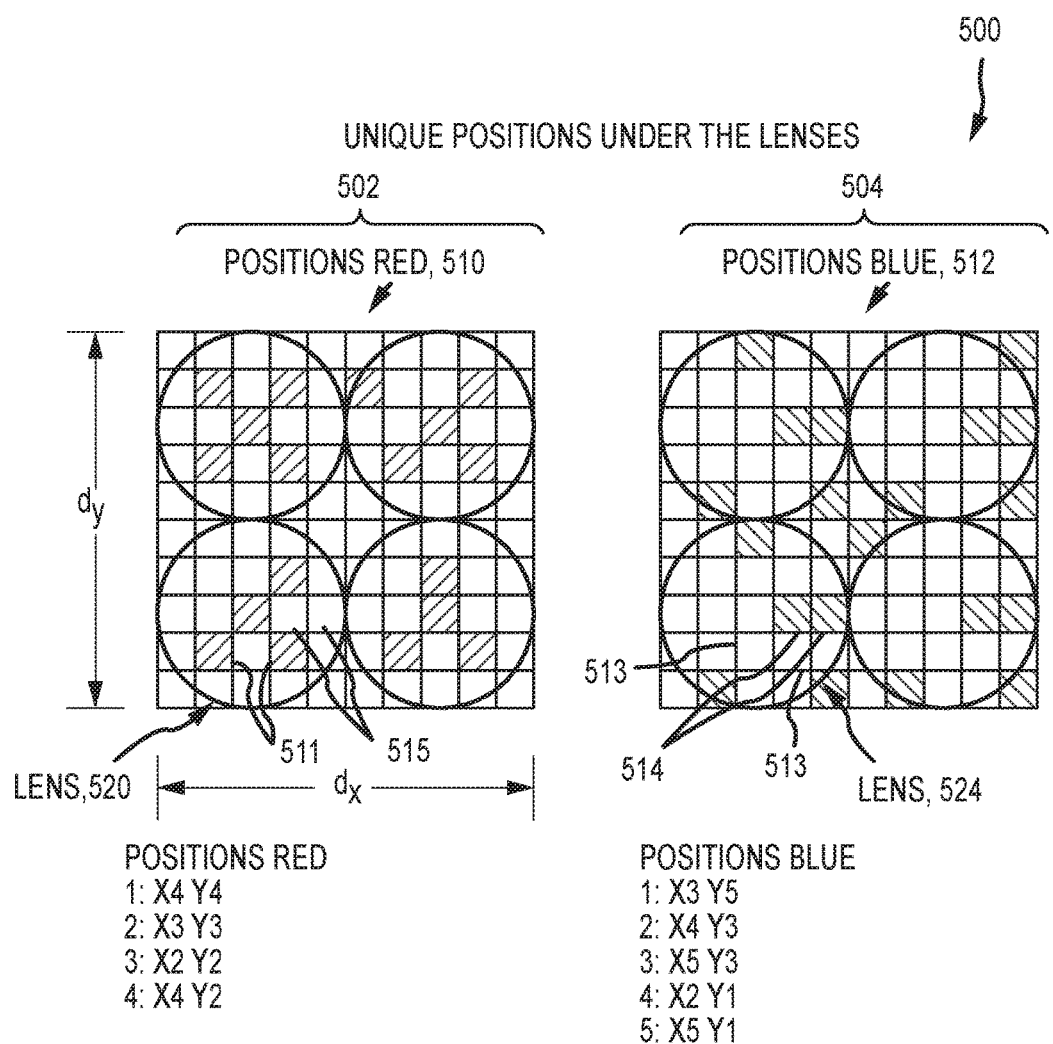
FIG. 5 illustrates with a schematic/functional top view a small portion of an optical security element showing a single section of the security element used for displaying a first image with a first set of pixels of a first color and an adjacent single section of the security element used for displaying a second image with a second set of pixels of a second color.

FIG. 5 illustrates with a schematic/functional top view a small portion of an optical security element 500 showing a first section 502 of the security element 500 used for displaying a first image with a first set of pixels 510 of a first color (e.g., labeled red in the drawing and provided in an ink or printed image layer of the security element 500) and a second section 504 of the security element 500 used for displaying a second image with second set of pixels 512 of a second color (e.g., labeled blue in the drawing and provided in the ink or printed image layer of the security element 500). Only two sections 502, 504 are shown, but a typical security element 500 would include tens to thousands of such sections to display each image (each color of an image and so on). Also, the number of lenses and pixels is shown to be relatively small for ease of illustration with it being understood that the principles taught herein are scalable up to each section 502, 504 including tens to hundreds of lenses and pixels under each lens.

Further, as discussed above, it may be desirable to avoid matching the section size to the lens size that provides an even integer number of lenses in the set of lenses used to display each section of a color image as this can lead to banding. For example, if the lenses are round and have a 25 micron diameter, it may be useful to avoid sizing the sections in the ink layer at 100 microns (or other multiple of 25 microns) as this will result in 16 lenses in each square (or an even integer) and instead to choose a section size that is 90 microns or 110 microns or the like (a number not perfectly divisible by the lens diameter).

In this example, the first section/portion 502 of the security element 500 includes a set of four micro lenses 520 covering the set of red pixels 510 (pixels of the first color), and as can be seen with the lens 520 in the lower lefthand corner the data-containing (or colored) pixels 511 are arranged in a first pattern while other pixels 515 under this lens are free of color/ink or are data-empty (or absent) pixels. The second section/portion 504 of the security element 500 is the same size and shape and includes a set of four micro lenses 524 covering the set of blue pixels 512 (pixels of the second color). In other words, the lenses 520 are dedicated for focusing on pixels of a first color while the lenses 524 are dedicated for focusing on pixels of a second color. The sections 502, 504 are shown to be rectangular in shape (e.g., square) with sides having lengths of $d_x$ and $d_y$, and these dimensions for the sections 502, 504 typically are chosen to suit a particular printing process and its registration error/variance to limit overlap of the two printed sections (sets of pixels) 510, 512 (such as by limiting overlap to 30 percent or less overall (or 15 percent or less per side) to provide 70 percent or more clean pixels in the sets 510, 512).

As can be seen with the lens 524 in the lower lefthand corner of the section 504, the data-containing (or colored) pixels 514 are arranged in a second pattern differing from the first pattern used for the corresponding lens 520 of section 502 while other pixels 513 under this lens are free of color/ink or are data-empty pixels. Hence, when lenses 520, 524 are focusing on pixels of the first color (such as pixels 511) for the lenses 520 they are not concurrently focusing on pixels of the second color (e.g., not on pixels 514) but are focusing on data-empty pixels (such as pixels 513) for the lenses 524. Similarly, when lenses 520, 524 are focusing on pixels of the second color (such as pixels 514) for the lenses 524 they are not concurrently focusing on pixels of the first color (e.g., not on pixels 511) but are focusing on data-empty pixels (such as pixels 515) for the lenses 520. In this manner, the display of each set of differently colored pixels (and their associate images) is cleaner than in prior optical security elements as the colored pixels are generally not overlapping (or printed in the same location in the security element's ink layer).

Figure 6:
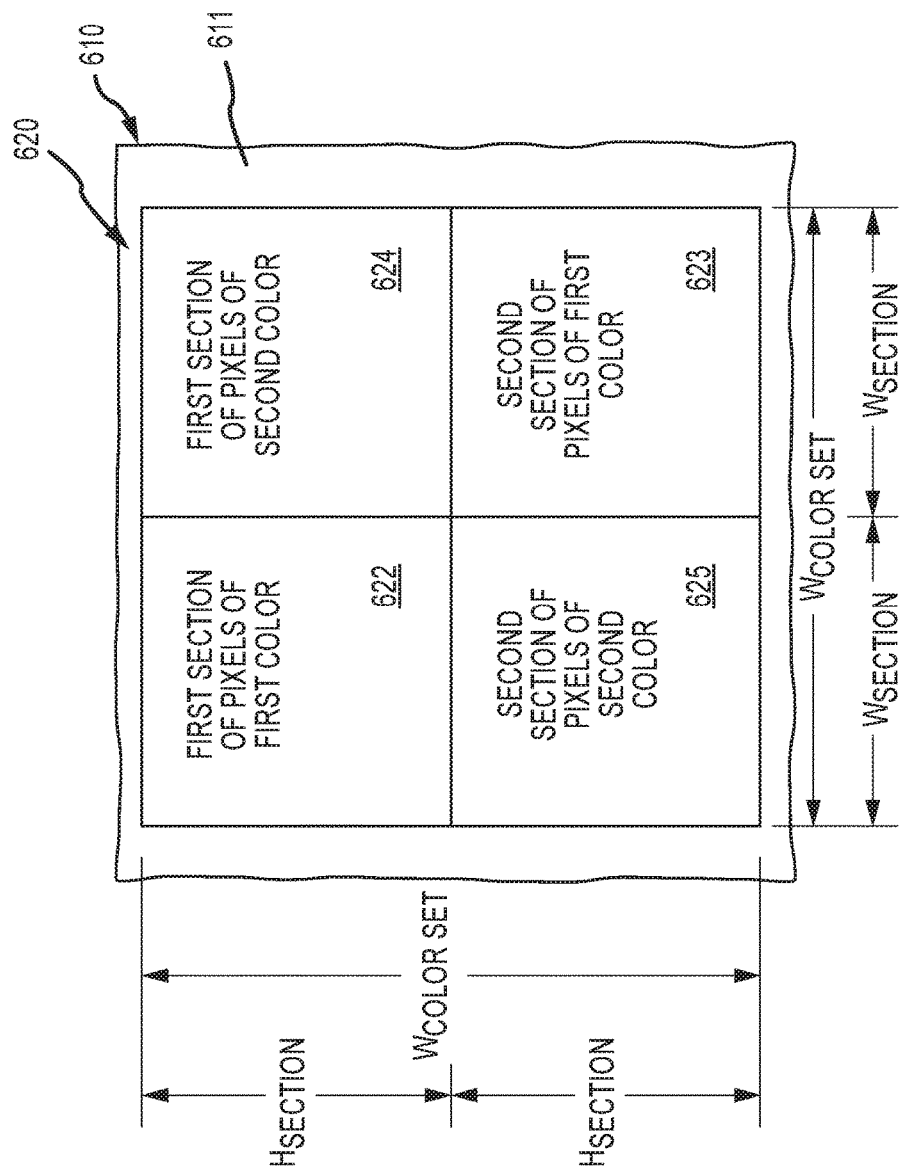
FIG. 6 illustrates a portion of an optical display assembly (or security element) showing a portion of a substrate/carrier film upon which an individual color set of an ink layer/printed image is provided.

FIG. 6 illustrates a portion of an optical display assembly (or security element) showing a portion of a substrate/carrier film 610. On a first surface/side 611 of the substrate/carrier film 610, an ink layer/printed image 620 is deposited or printed according to printing processes described herein. Particularly, the portion of the ink layer 620 shown may be considered one color set of the ink layer/printed image 620, and the optical security element/display assembly would typically include numerous other color sets arranged in a checkerboard/chessboard pattern by repeating the pattern shown in FIG. 6.

Specifically, the color set 620 is shown to include a first section of pixels 622 of a first color side-by-side or adjacent in a horizontal row with a first section of pixels 624 of a second color. Further, the color set 620 includes a second section of pixels 625 of the second color below (and adjacent to) in a vertical column with the first section of pixels 622 of the first color and yet further includes a second section of pixels 623 of the first color below (and adjacent to) in a vertical column with the first section of pixels 624 of the second color (or, in other words, the second or lower row is offset by one section from the first or upper row to achieve a checkerboard/chessboard arrangement). In this way, the color set 620 includes an equal number of sections for each color (assuming that only two colors are displayed but similar design principles apply to use of a larger number of colors) as well as an equal number of pixels for generating each of two colored images.

In this example, the sections are shown to be square in shape and have a height, $H_{Section}$, and a width, $W_{Section}$, and these dimensions when added together define, respectively the height, $H_{Color\ Set}$, of a color set of ink layer 620 and the width, $W_{Color\ Set}$, of the color set of the ink layer 620. Here, a color set is chosen to be a portion of rows and columns equal to the number of differing colors being displayed in the security element/display assembly (e.g., a 2 by 2 array of sections for two colors, a 3 by 3 array of sections for three colors, and so on). Generally, the size of the color set 620 (and each section) is chosen based on the registration error/variance of the printing device/process used in printing the ink layer of an optical security element. As a minimum, the color set's height, $H_{Color\ Set}$, and width, $W_{Color\ Set}$, are chosen to be greater than the registration error. More typically, these dimensions will be 2 to 20 times or more greater to give a large percentage (i.e., 70 percent or greater) of "clean" or non-overlapping pixels in each section. For example, the registration error may be 20 microns, and the color set may have dimensions of 200 microns, with each section having dimensions of 100 microns. This example provides more than 70 percent (such as about 80 percent or more) clean pixels even when the printing is towards its maximum registration error/variance (or plate movement).

Figure 7:
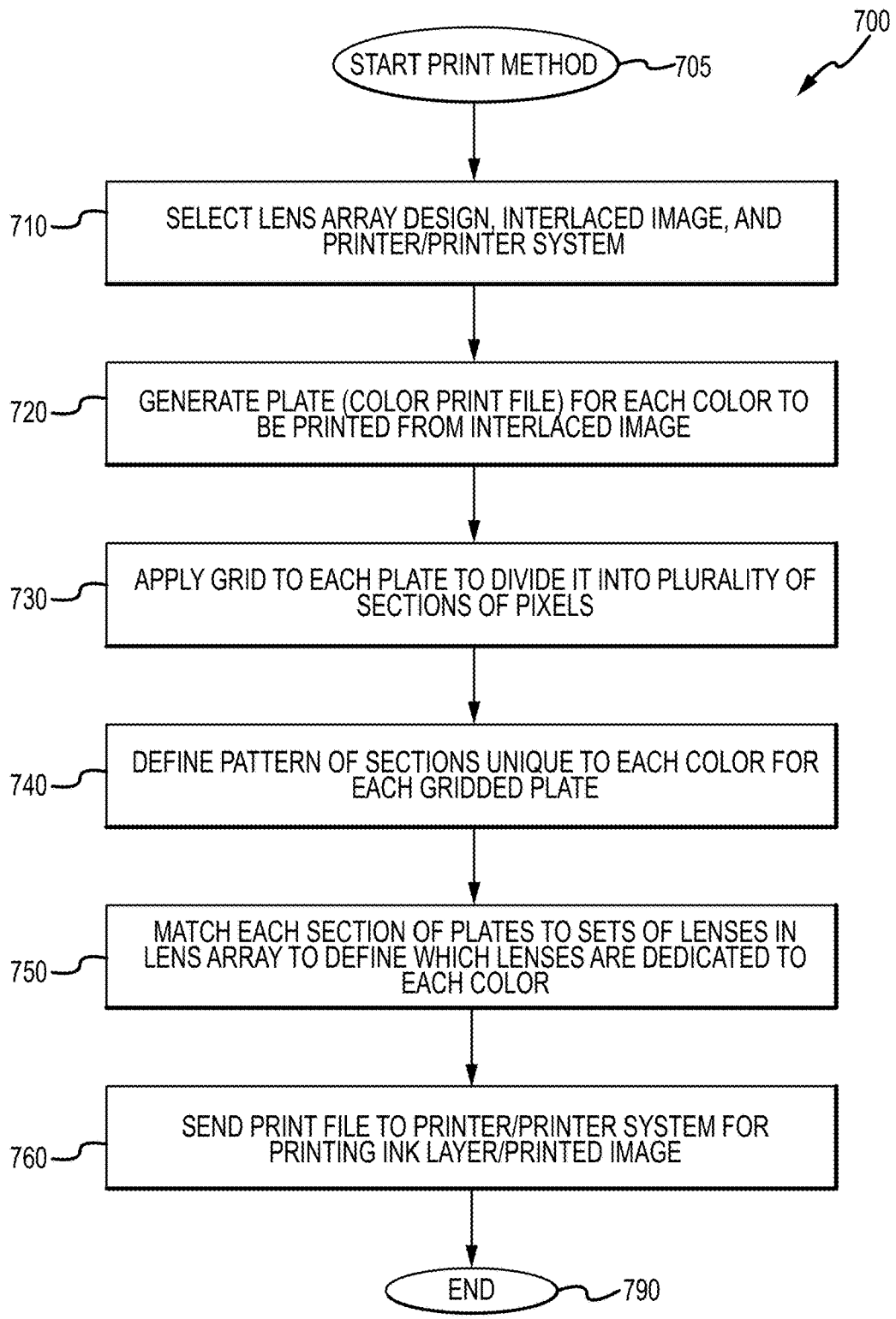
FIG. 7 illustrates a flow diagram for a printing method for use in fabricating lens-based display assemblies such as optical security elements.

FIG. 7 illustrates a flow diagram for a printing method 700 for use in fabricating lens-based display assemblies such as optical security elements. The method 700 starts at 705 such as with initiating a workstation or computer system for use in generating a print file for printing an ink layer with pixels of each color positioned in sections/areas that are paired with lenses dedicated to focusing on that particular color. This may involve providing a print file generator (e.g. a software suite or set of programs) on the workstation, and this print file generator is configured for performing the processing functions described herein on a digital interlaced image file to create a print file for controlling a printer/print system.

The method 700 continues at 710 with selecting or defining design parameters for the particular lens-based display assembly. This may include selecting and defining parameters of the printer or print system to be used, which provides parameters including registration variance/error (e.g., 10 to 40 microns and the like). Step 710 may also include choosing a lens array design that provides the design of each individual lens (shape, size, and so on) as well as optical pitch and lenses per inch/density. Further, step 710 includes choosing an interlaced image for use with the lens array design to create a particular visual effect. The interlaced image is a digital file providing two or more images/frames that have been interlaced in any useful manner, and the types and techniques of interlacing are well-known in the arts such further description is not provided herein as nearly any type of interlacing of images may be used to create the interlaced image (such as for lenticular material, for sheets of round micro lenses, for creating special effects with the images that are interlaced to form the interlaced image, and so on). The interlaced image is typically formed from two or more color images/frames with numerous pixels of one or more color.

The method 700 continues at 720 with generating a plate (or color print file) for each color to be printed from the interlaced image. For example, conventional color separation software such as a raster image processor (RIP) or the like may be used to divide the interlaced image based on color to form two or more digital files or plates that have all the pixels of each individual color to be used in the printing process to create an ink layer/printed image. Each plate may be a raster image or bitmap that can be used in a later stage of the printing system to produce the printed output (or ink layer/printed image as labeled herein). An RIP can be implemented either as a software component of an operating system or as a firmware program executed on a microprocessor inside a printer, and the step 720 may be performed using Ghostscript™, GhostPCL™, or other software RIP.

The inventors recognized that it is possible to provide useful color displays without using all the pixels of these plates of step 720 and to display subsets of each color plate with sets of lens in a lens array dedicated to focusing on that particular color. With this in mind, the method 700 continues at 730 by applying a grid to each color plate to divide its pixels into a plurality of sections/boxes of pixels. The size of each section/box in the grid may vary to practice the invention with some embodiments choosing a size that is large enough such that a color set (a set of sections that includes one of each color) is greater in size than the registration error/variance of the printer/print system chosen in step 710. In some cases, each section/box typically may be square with each side being 3 to 10 times as large as the registration error so that the result is more than 70 percent of the pixels in each printed section of a printed image/ink layer are clean or free from overlapping pixels/ink from other colored sections/boxes.

In step 740, the gridded plates are processed to define a subset or pattern of the sections/boxes to be used in the printing process. A unique pattern is used for each color plate, and the patterns used to choose the subset of sections/boxes for each color is chosen such that typically an equal (or substantially equal) number of sections (and pixels) are printed for each color and such that the sections of each color are regularly spaced apart through the ink layer/printed image. For example, the patterns may be chosen such that the ink layer/printed image has a checkerboard/chessboard appearance. For example, when two colors/plates are generated in step 720, the patterns may result in every other section/box in each row being chosen for the first color and the sections/boxes not chosen for the first color being chosen for the second color. The next row would then be offset one section/box from the prior row to achieve the checkboard/chessboard appearance. Other patterns may also be used to provide substantially equal (e.g., within about 10 percent of each other) numbers of sections/boxes from each color plate in the final print file (or printed image/ink layer).

The method 700 continues at 750 with matching each section of the plates with a set of lenses in the lens array so as to define which lenses are used/dedicated for use in focusing on the pixels of each color. As discussed above, some embodiments may be configured such that even numbers of lenses corresponding to each section may not be beneficial as it may create unwanted visual patterns, and step 750 may be carried out such that a fractional number of lenses in both axes are mapped to each section/box of each color plate (e.g., 4.5 rows and 4.5 columns of micro lenses to each section/box or the like) rather than integer values. The method 700 continues at 760 with sending the print file, which includes all the color plates that have unique patterns applied to define which sections/boxes in each plate are to be printed during printing of that color ink, and the printer responds by printing ink of each color in an ink layer/printed image according to the print file. The printing may be directly onto the back of the lens array or upon a surface of a substrate or carrier film, which is then mated with the lens array to form the lens-based display assembly (such as an optical security element). The method 700 then ends at step 790 or step 710 may be repeated for a next print job.

Figure 8:
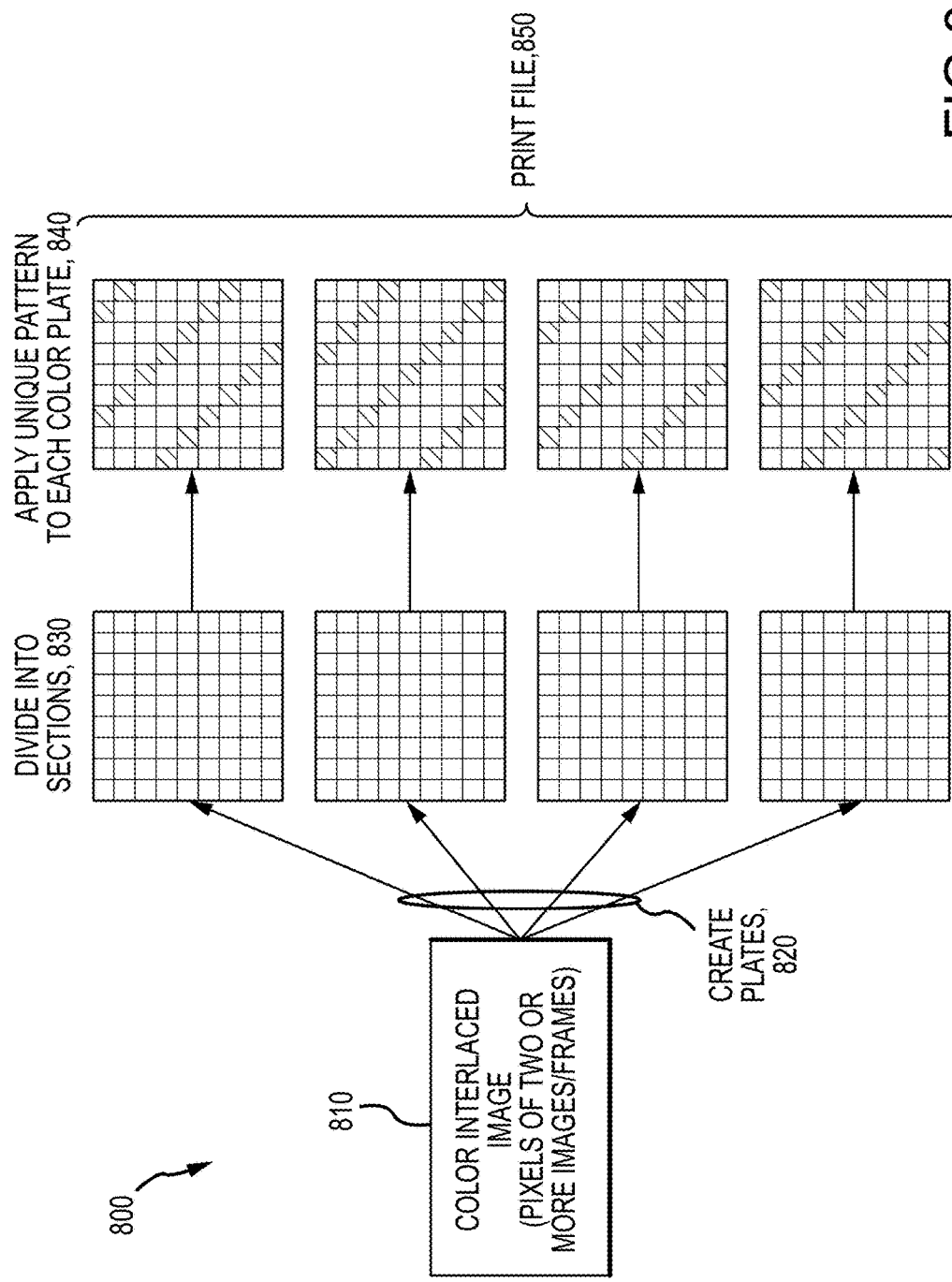
FIG. 8 illustrates schematically steps in creating a print file for use in printing pixels of different colors under different sets of lens of a lens array (e.g., under a sheet/layer of round or other shaped micro lenses)

FIG. 8 illustrates schematically steps in a process 800 of creating a print file for use in printing pixels of different colors under different sets of lens of a lens array (e.g., under a sheet/layer of round or other shaped micro lenses). At 810, a color interlaced image 810 is retrieved or accessed in memory, and the interlaced image includes pixels corresponding with two or more images/frames. At 820, color separation is performed to create from the interlaced image two or more plates (with four shown such as a C plate, a M plate, a Y plate, and a K plate for a CMYK printing process or the like) that include all the pixels of each individual color arranged in a pattern that is useful for creating a color display (of a color image or two or more color images with or without visual effects defined by the interlacing technique used to create the interlaced image 810).

At 830, each of the color plates is divided (such as with a grid pattern of rows and columns) into a plurality of sections/boxes (of pixels), with the same dividing process used on each plate such that there is an equal number of sections/boxes in each gridded/divided plate (and with the sections/boxes having the same shape, size, and locations). Then, at 840, a unique pattern is applied to each gridded/divided color plate (e.g., a pattern associated with each color) to identify a subset of the sections/boxes in each color plate 830 to be used in printing a print image/ink layer. As discussed above, it is desirable to have an equal number of sections/boxes chosen in step 840 for each of the plates and for these to be spaced apart relatively equally to produce a quality color imagery with the optical security element/lens-based display assembly. A print file 850 is then generated with the set of color plates from step 840 that can be used by a print controller to operate a printer/print system to apply the two or more colors in an ink layer/printed image on a substrate or upon the back of the lens array.

Figure 9:
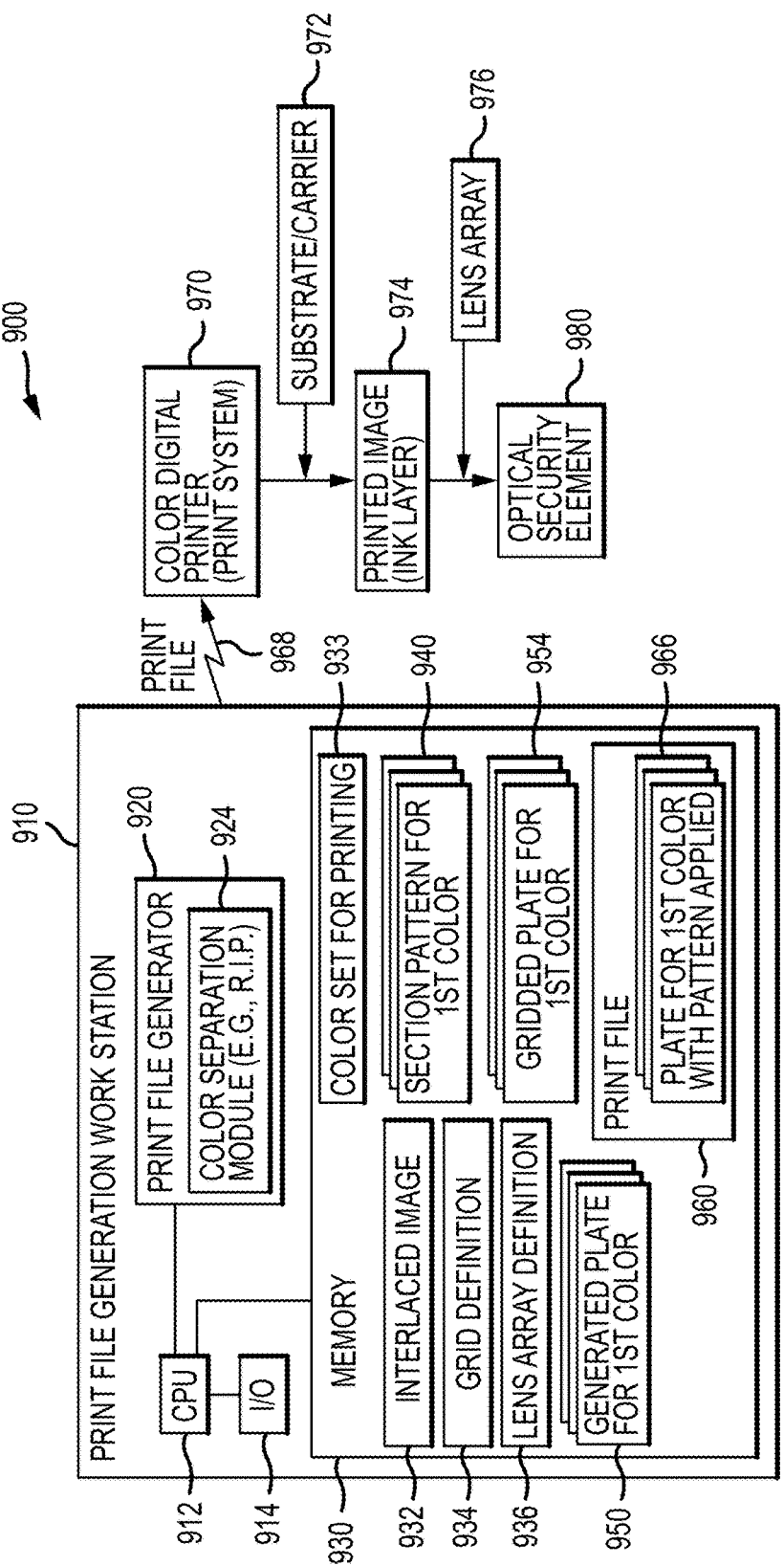
FIG. 9 is a functional block diagram of a print system operable to create a print file according to the present description and create an optical security element (or other lens-based display assembly)

FIG. 9 is a functional block diagram of a print system 900 operable to create a print file 960 according to the present description and create an optical security element (or other lens-based display assembly) 980. The system 900 includes a print file generation workstation 910 that includes a processor(s) 912 for executing code/instructions (or software) to provide the functionality of a print file generator 920. The workstation or computer 910 also includes input/output device 914 managed by the CPU 912 (and an operating system run on the workstation 910) to allow a user to provide input and view output and work in progress. The workstation 910 also includes memory or data storage 930 used to store digital information/data/files useful by the print file generator 920 and generated by the print file generator 920, and the data storage and retrieval from the memory 930 is controlled by the processor 912.

As shown, the memory 930 is shown to include an interlaced image 932, which is a digital file defining the interlacing of two or more color images/frames for display with a lens array 976. The memory 930 also includes a lens array definition 936 that defines values for design parameters of the lens array 976 such as lens shape, lens size, lens density/frequency, and the like. The memory also includes a grid definition 934 defining section/box dimensions for use by the print file generator 920 in creating a print file 960. Also stored in the memory 930, a color set for printing 938 is stored, and this may be default or set based on user input via I/O devices 914 and indicates which two or more colors are to be printed in the printed image/ink layer 974 by the printer 970 (e.g., all colors, first and second colors, first, second and third colors, and so on). The sizes of the sections/boxes of pixels defined is useful for matching the sections to sets of lenses in the lens array 976 (and this may be non-integer numbers of lenses for each section/box as discussed above). Additionally, the memory 930 includes a section pattern for each color 940 that defines which sections/boxes for each color plate are to be used in the printing process.

During operations, the print file generator 920 accesses or retrieves the interlaced image 932, and the generator 920 uses a color separation module (e.g., an RIP or the like) to create a plate 950 for each color in the printing color set 938. Generally, there will be at least two plates 950 with three or four being common for many optical security elements 980. The print file generator 920 than processes each of the generated plates 950 based on the grid definition 934 to divide each plate into a plurality of sections/boxes to provide gridded plates for each color as shown at 954. The print file generator 920 then functions to process each of these gridded plates 954 with the section pattern 940 for each particular color so as to generate a plate for each color with the pattern applied to define which sections/boxes are to be used in printing 966 as shown at 966. The combination of these color plates that have been gridded/divided into sections and that have been patterned to define printing subsets of sections is stored in memory as shown at 966 and used to create a print file 960.

Then, printing may proceed, with the workstation 910 providing a copy of the print file 963 to a color digital printer/print system 970 (or its print controller). The printer 970 uses the print file 968 to print each color of ink defined in the color set 938 based on each plate 966 on a substrate/carrier film 972 (or directly on the lens array 976) so as to form the printed image/ink layer 974. The printer may be configured to provide the printing on the lens array or substrate surface using offset printing, flexography, gravure, or digital printing. There is some overlapping of the pixels of differing colors due to registration error/variance/tolerances of the printer 970, but it will be significantly less than with prior printing techniques that printed every color under every lens. For example, 70 percent or more of the area (and pixels) of each section/box that is printed to provide the printed image/ink layer 974 may be "clean" or non-overlapping (e.g., only one color in a particular location). The optical security element or lens-based display assembly 980 is then formed by mating the lens array 976 with the printed image 974 and substrate 972 (when the ink layer 974 is not printed directly onto the lens array 976—in which case, the substrate if used may be applied to the lens array 976) so that each printed section/box of colored pixels is positioned under sets of lenses dedicated to focusing on that particular color.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the printing techniques discussed herein are useful with a wide variety of lenses including micro lenses with a focal length less than $10/1000$ inches.

With the above methods and optical display features understood, it may be useful to further describe the use of RIP software that is modified to provide the functionality taught herein and to further explain use of a mask with the printed color blocks/dots to provide improved visual effects. A raster image processor (RIP) is a component (software and/or firmware) used in a printing system which produces a raster image also known as a bitmap. Such a bitmap is used by a later stage of the printing system to produce the printed output. Digital half-toning refers to the process of converting a continuous-tone image or photograph into a pattern of black and white picture elements for reproduction by a binary display device such as an ink jet printer, which can only choose to print or not print dots. In these digital printers, the half-toning process of projecting a continuous-tone original through a halftone screen has been replaced with a raster image processor (RIP) that converts each pixel of the original image from an intermediate tone directly into a binary dot based upon a pixel-by-pixel comparison of the original image with an array of thresholds. Pixels of the original with intensities greater than their corresponding threshold are turned "on" (printed) in the final half-toned image while pixels less than their corresponding thresholds are turned "off." From a full color picture of a face for example, the RIP will convert each of the original pixels into binary C, M, Y, or K pixels that can be printed by the device. It is also important to notice that any shade or color will be accomplished by the right combination and percentages of binary dots C, M, Y or K.

For a lens based image it is impossible to register the four color process dots under each lens. In a first alternative, the registration is performed as discussed above. However, some preferred embodiments use a second alternative to perform registration. It is possible to work with sections of colors just like the diagrams and obtain a perfect color and image flip like this example (of FIGS. 4A and 4B). In this registration process, a section or group of lenses contains information (pixels) from one image and first color, and another section or group of lenses contains the information from the second image and second color. In this case shown in FIGS. 4A and 4B, both images (bird and dog in this example) are simple shapes and each one was chosen to have solid color (no shades or tones in this example).

Figure 10:
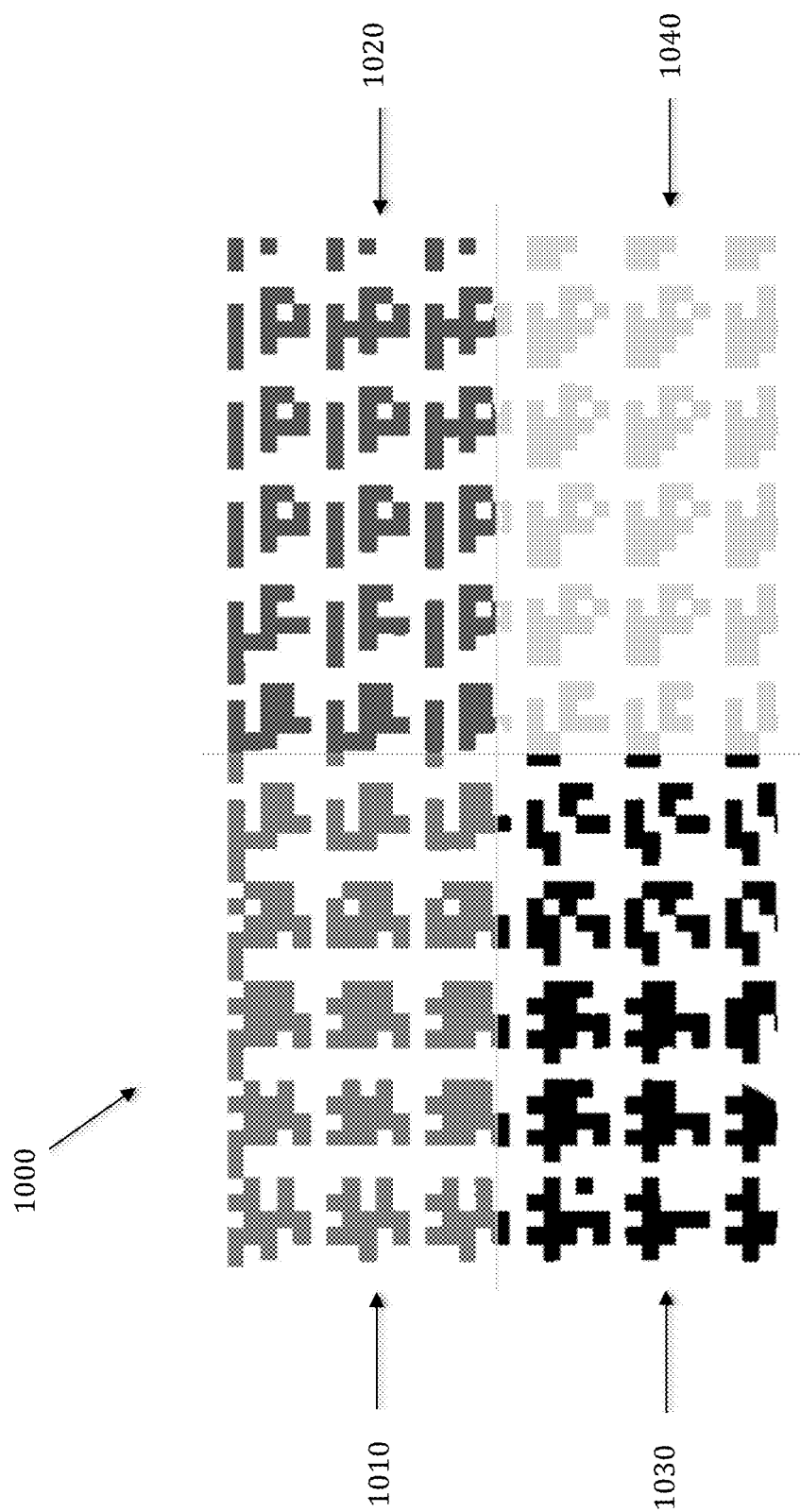
FIG. 10 illustrates a portion of a printed image/ink layer with a pattern of dots or blocks that may be used during printing to provide four differently colored pixels.

As a more sophisticated alternative, an actual full color picture of a dog and a bird may be used, but the registration requirements may be difficult to nearly impossible for a lens feature. The inventors recognized and generated one useful solution. First, the fabrication process involves using a pixel mapping system for the full color frames (or original images) to create an interlaced image in full color. Second, the image is run through RIP software to generate a pixel mapped or interlaced image in a binary fashion containing only C, M, Y, and K dots. Usually this is the image that is printed, but, in this case, the registration requirements for a micro lens makes this impossible or at least very difficult. Third, the rasterized image (or each of the C, M, Y, and K files containing the corresponding dots from the interlaced image) is taken and used to create sections of colors in a chessboard like configuration and selecting only the corresponding dots to each section. The sections that are selected for cyan will only contain the cyan dots and all the other colors are deleted from that section, with similar processing for all the other sections. This way the interlaced image will look like the image 1000 in FIG. 10. For simplicity, this example image 1000 is shown with just four sections 1010, 1020, 1030, and 1040, (e.g., one for each color). The idea is to print this image, but even these macro sections of color 1010, 1020, 1030, and 1040 may present challenges for registration.

Figure 11:
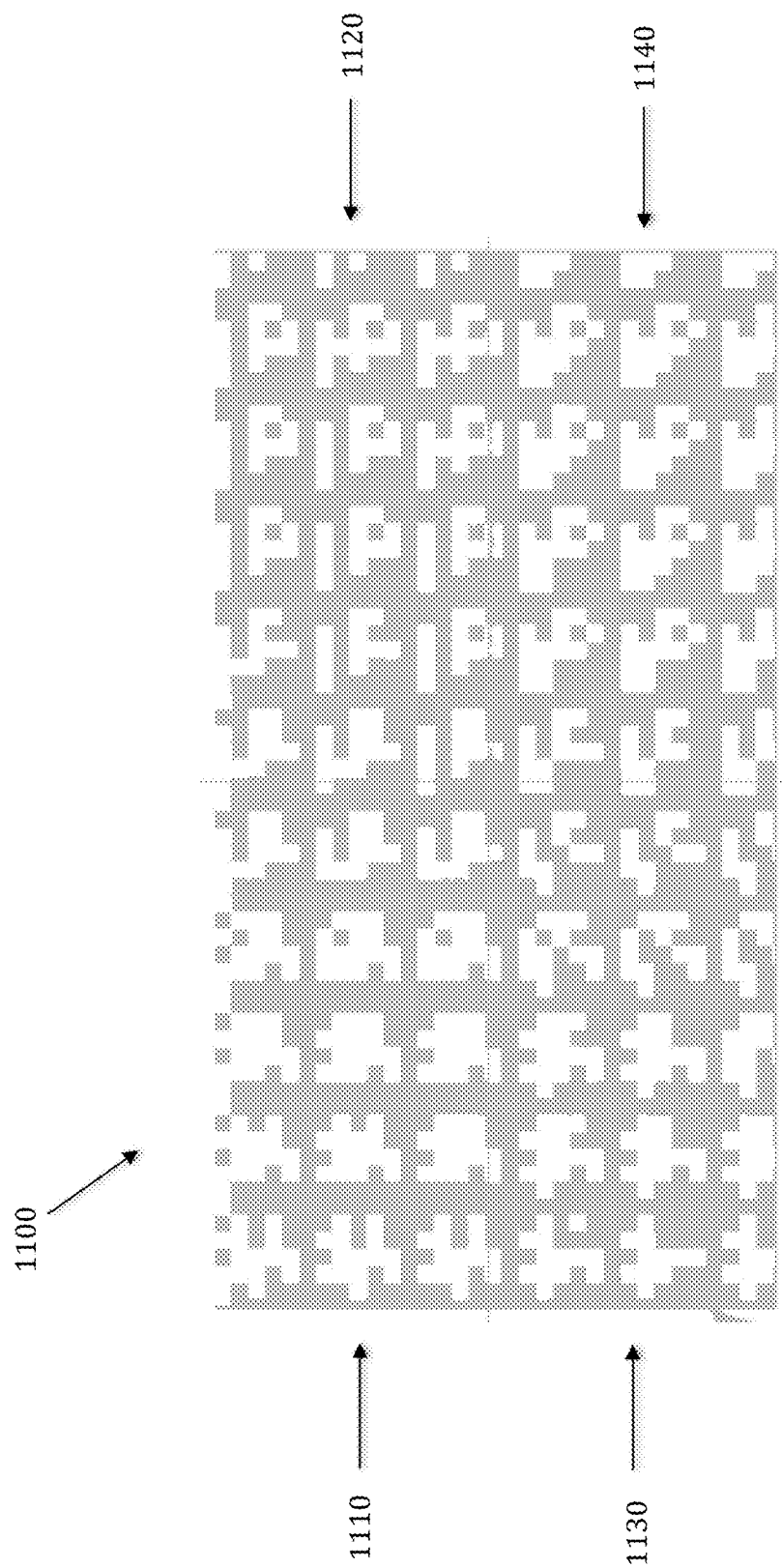
FIG. 11 illustrates a portion of a digital mask file or mask image that may be created from the portion of the printed image/ink layer shown in FIG. 10 and used to form a mask for inclusion in an optical display assembly between the printed image/ink layer to address registration issues during printing.

However, the inventors recognized that it may be useful to generate a digital mask file as shown at 1100 in FIG. 11 with the four sections 1110, 1120, 1130, and 1140. The digital mask file 1100 can be created from the image 1000, with the sections 1110, 1120, 1130, and 1140 corresponding with sections 1010, 1020, 1030, and 1040 but containing the absence of color (or blank spaces where color dots/pixels are in image 1000). This image 1100 is the "inverted" image from all the colors that contains the perfect registration and interlaced information for each group of colors 1010, 1020, 1030, and 1040.

A mask may be generated or fabricated from the file/mask image 1100 for inclusion in an optical display assembly or feature described herein, and this mask would be positioned between the ink layer/color dots or blocks and the lens array. The mask may be formed as a trough(s) via a demetallization process, may be generated using excimer laser ablation, or may be formed using some other opaque mask system that can be registered with printed blocks of color. An advantage to the use of the mask is that each of the printed blocks of color can have some room for unregistration or overprinting, but the "mask" will provide the image back to the viewer in perfect registration. In this case, the blocks or dots or pixels of color can be printed directly on the back of the mask or they can be printed on the banknote/substrate, and the mask with the lenses applied on top. Each of the color sections 1010, 1020, 1030, and 1040 has the right percentage of color dots to create any color or shade because they come from the image processed by the RIP software/firmware such that the viewer will see a full color image through the lenses with the corresponding effect or animation.

In some preferred implementations, the ink layer or printed image is a checkboard pattern of colored blocks rather than a printing of the pixels/color data from the interlaced image and color plates. In these embodiments, a solid color block (e.g., a cyan block, a magenta block, a yellow block, or a black block in a CMYK implementation) is provided in the ink layer/printed image, and the mask is configured to allow the color to be seen underneath each set of lenses (which are dedicated to a particular color) at the pixels and/or with the desired percentages to create the colored interlaced image. As discussed above, the mask is also configured to be blank or block colors under sets of lenses that are not designated to focus on that color.

The optical display assembly, which may be used as a security element for example, may be used with a transparent substrate (e.g., polymer currency or the like) or with a paper (or opaque) substrate (e.g., for paper currency, on a product label, on a front side of a financial card or identification document, or the like). For example, the bank note 100 of FIG. 2 may be implemented with a carrier film or transparent substrate 144 (e.g., 80 micron-thick polymer sheet or the like) and a lens array 141 of linear or micro lenses (e.g., 60 micron lenses with a thickness of 92 microns or the like) 142. The image element 148 in the color block embodiment would include a mask (as designed according to the description below for example) on or against the surface 114 of the substrate 144 and with an ink layer/printed image printed on the opposite side of the mask (e.g., with the mask sandwiched between the ink layer and the substrate surface 114), and this ink layer/printed image would have a checkerboard pattern of colored blocks that are aligned with and printed under sets of the lenses 142 that are chosen to focus on that particular color.

Figure 12:
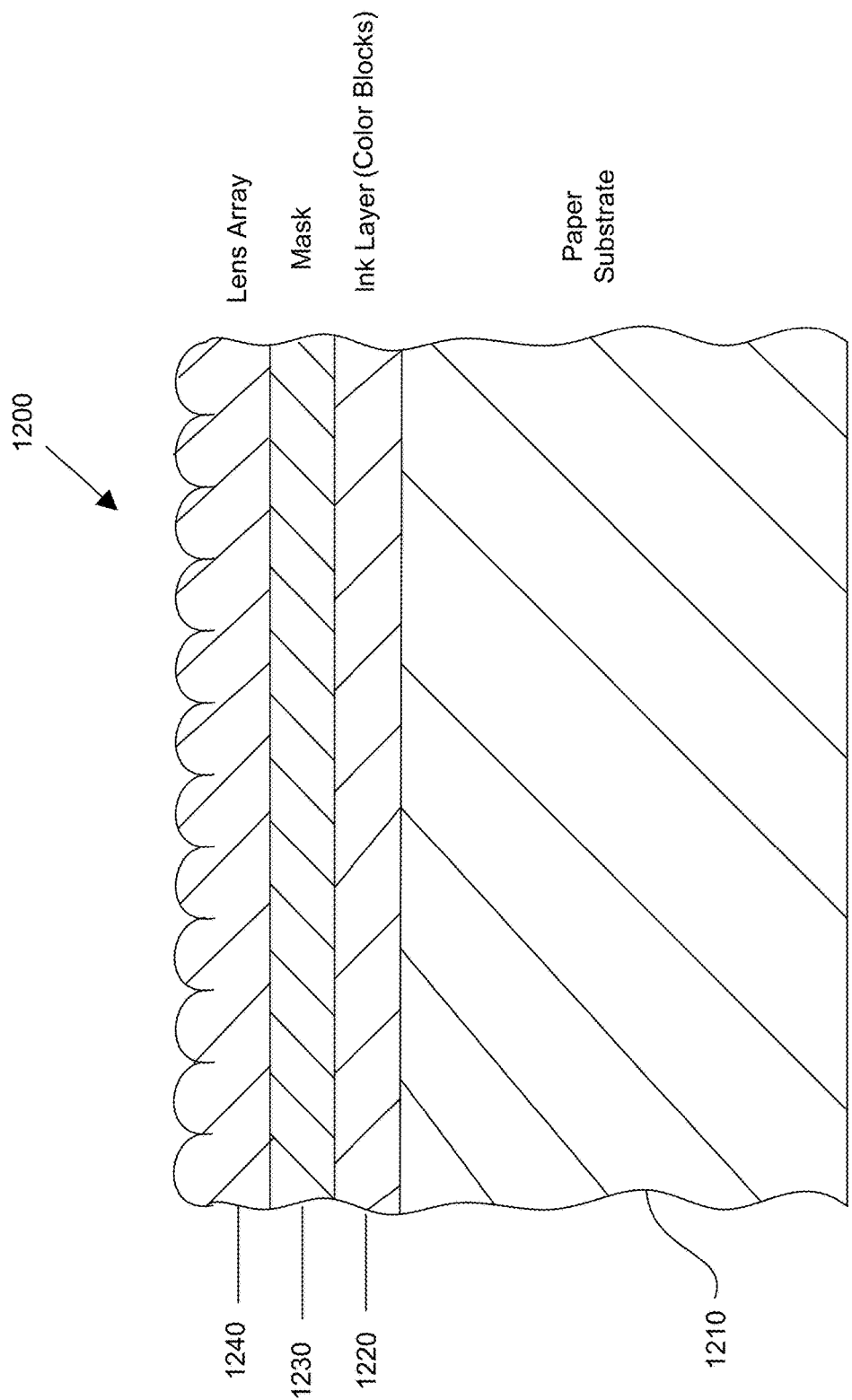
FIG. 12 is a sectional side view of a product of the present description including a paper/opaque substrate and an optical display assembly that includes a mask and an ink layer including a plurality of color blocks in a checkboard pattern.

FIG. 12 illustrates a paper (or other opaque material) substrate implementation of a product (such as paper currency) 1200 with a lens-based display apparatus or assembly (e.g., the upper three layers of the product 1200). The product 1200 includes a paper (or other opaque/translucent material) substrate or sheet/film 1210. An ink layer/printed image 1220 is provided on a side or surface of the substrate 1210, and the ink layer/printed image 1220 includes a plurality of colored blocks (two or more colors) arranged in a checkboard manner to be underneath sets of lenses in a lens array 1240 (e.g., a sheet of micro lenses (e.g., 20 micron lenses or the like) with an array thickness of 22 microns thick (or other useful thickness)). Further, a mask 1230 is provided in the product 1200 so as to be sandwiched between or interposed between the ink layer 1220 and the lens array 1240, with the mask 1230 on or against the planar back side/surface of the lens array 1240. In practice, the mask 1230 may be formed on the planar back surface of the lens array 1240 and the ink layer 1220 printed upon the opposite side of the mask 1230, and this optical display assembly may be attached to the side/surface of the substrate 1210. In other cases, though, the ink layer 1220 may be formed on the paper substrate 1210, the mask 1230 may be formed on the lens array 1240, and the mask/lens array combination may be applied to the substrate 1210 to abut the previously applied ink layer 1220.

At this point in the description, it may be useful to describe a method of generating a mask and an ink layer/print image for an optical display assembly that utilizes color (or colored) blocks combined with a mask to present lens-based imagery with two or more colors. As will be understood from the prior discussion, each color block is printed in a pattern (checkboard or the like) such that its colored blocks are aligned with sets of lenses in a lens array chosen for focusing on the particular color of each of these blocks, and a mask is used to define for a particular image the dots or pixels of each image/frame of an interlaced image that are displayed via the lenses.

Figure 13:
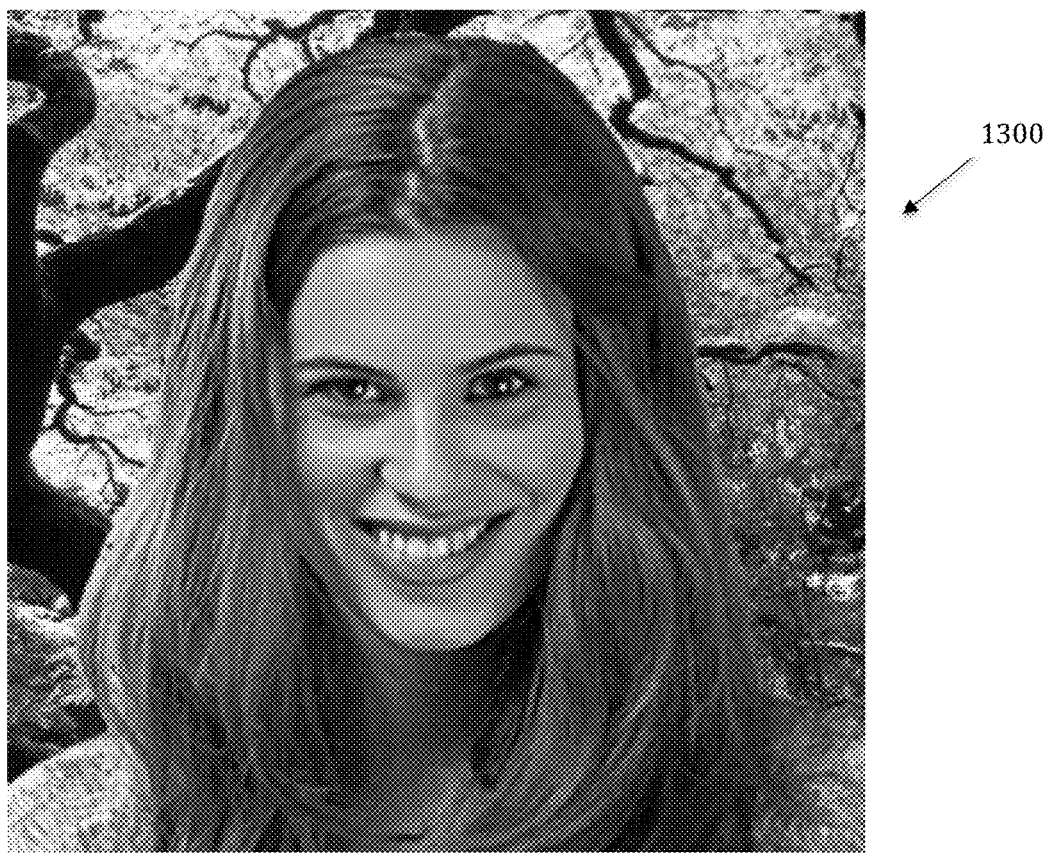
FIG. 13 shows image of one image out of a set of frames of a sequence used to form a full color interlaced image.

The method begins with choosing (or accessing from memory) a sequence or matrix of frames (digital images) that typically will have images that are of two or more colors with full color sequences of frames used in many embodiments. FIG. 13 illustrates an image 1300 of one such frame out of an exemplary sequence of frames (e.g., full color using CYMK or the like). The frame sequence is interlaced using a pixel mapping system or software to match or achieve the desired effect and to suit the lens array. The method continues with processing the interlaced image with a color separation module (e.g., an RIP or the like) to create or provide color separation for the digital interlaced image. The output of the RIP/color separation module may be four files, i.e., one plate or file for each color (C, M, Y, and K), but, to simplify explanation, all four files are presented in one file. Particularly, FIG. 14 illustrates an image 1400 that is a preview or representation of that single color separated file provided by the RIP.

Figure 15:
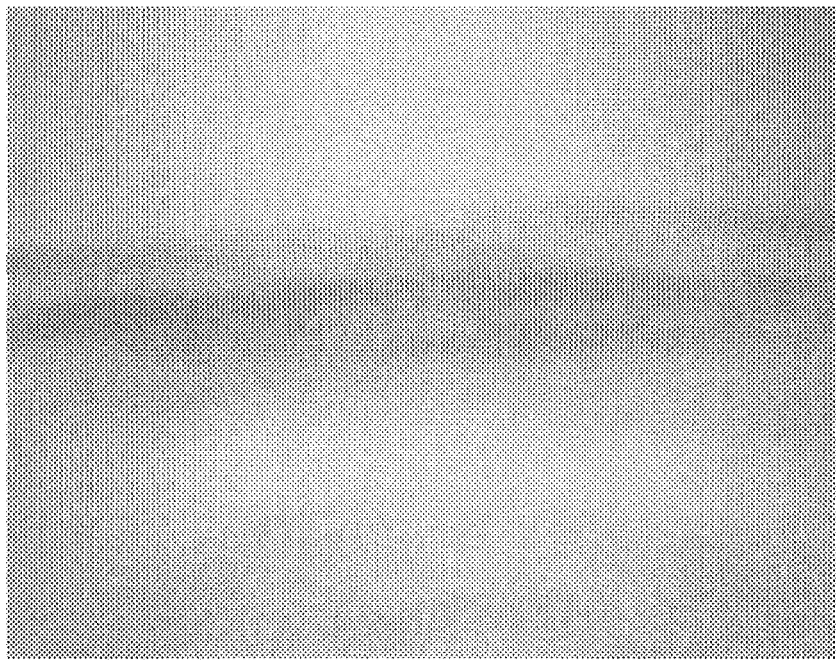
FIG. 15 illustrates an enlarged or "zoomed in" portion of the image of FIG. 14 (e.g., a portion near the eyes of the person in the color image)
Figure 16:
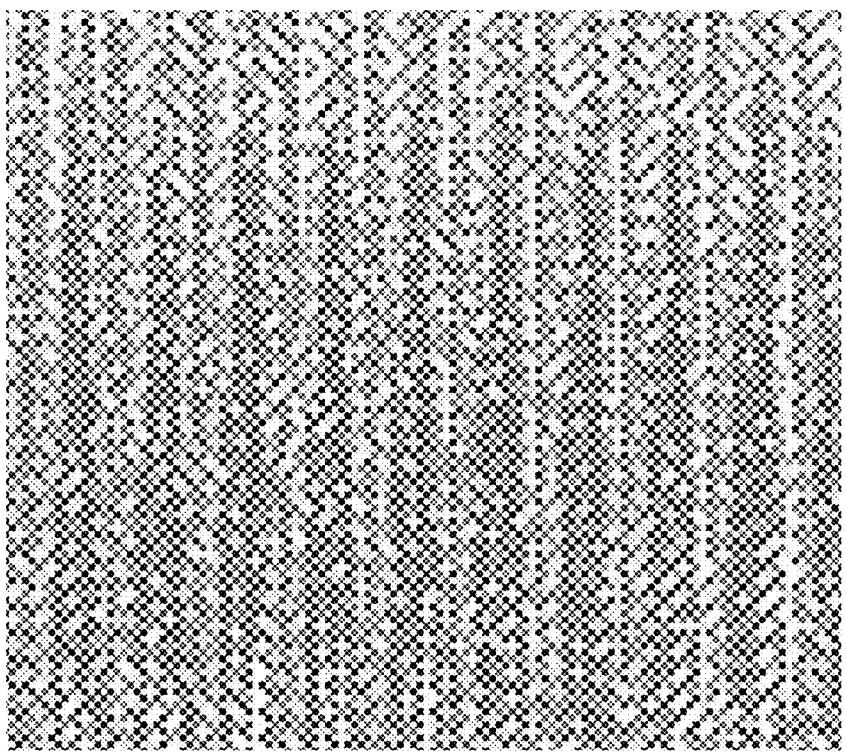
FIG. 16 illustrates a further enlargement or zoomed-in portion of the image of FIG. 15 showing the individual color pixels or dots in the digital file of the image that can be used in printing the image of FIG. 13.
Figure 17:
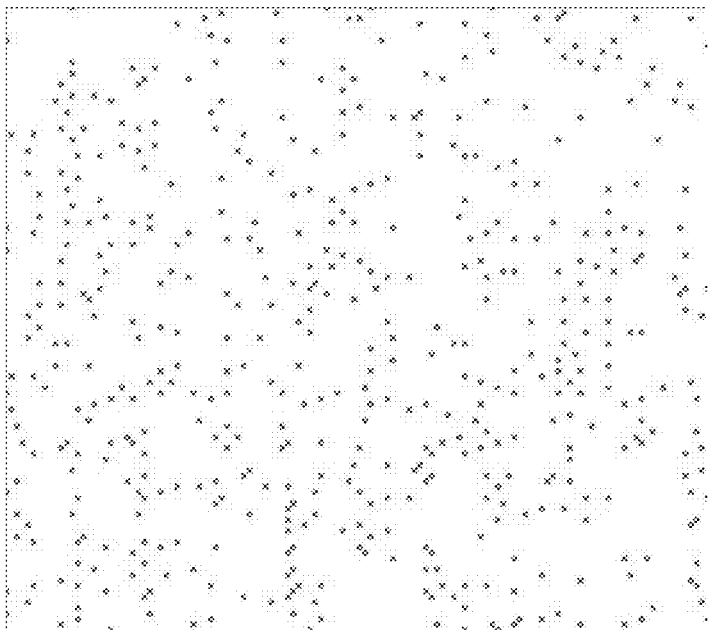
FIGS. 17-20 illustrate images generated as part of performing the color separation of the image of FIGS. 13-16 into four colored (C, Y, M, and K) plates for printing.
Figure 18:
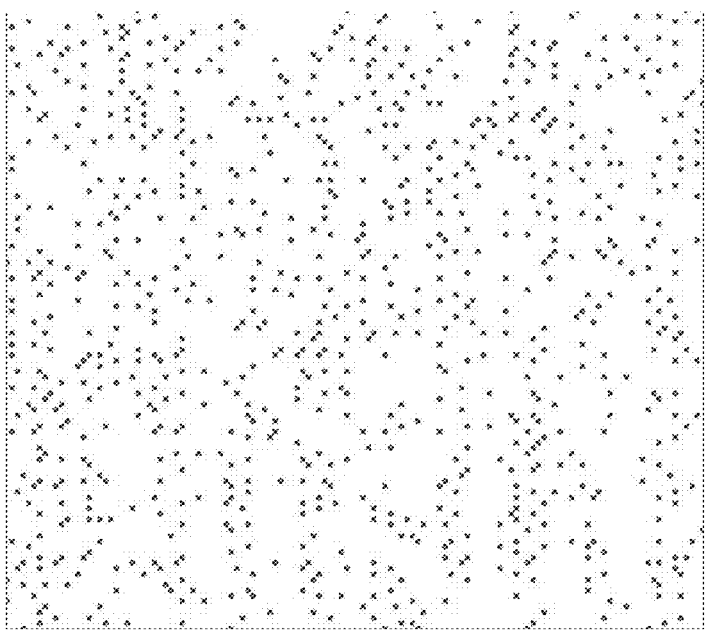
Figure 19:
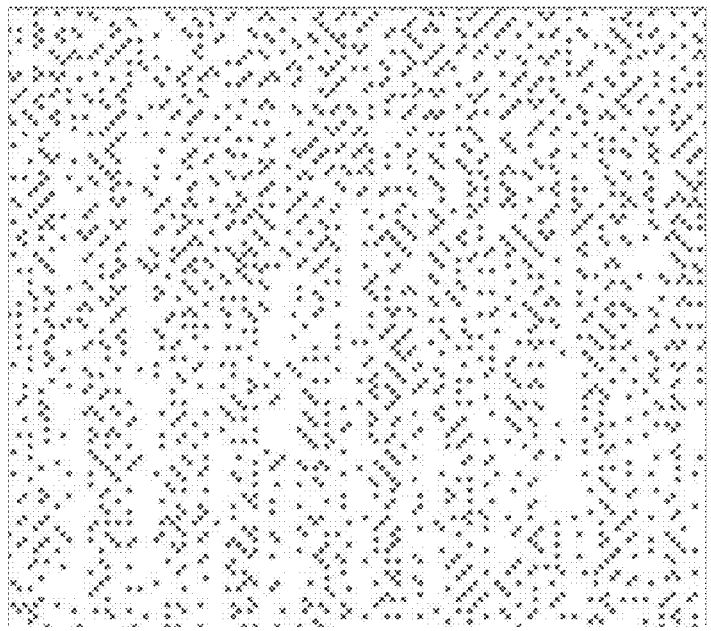
Figure 20:
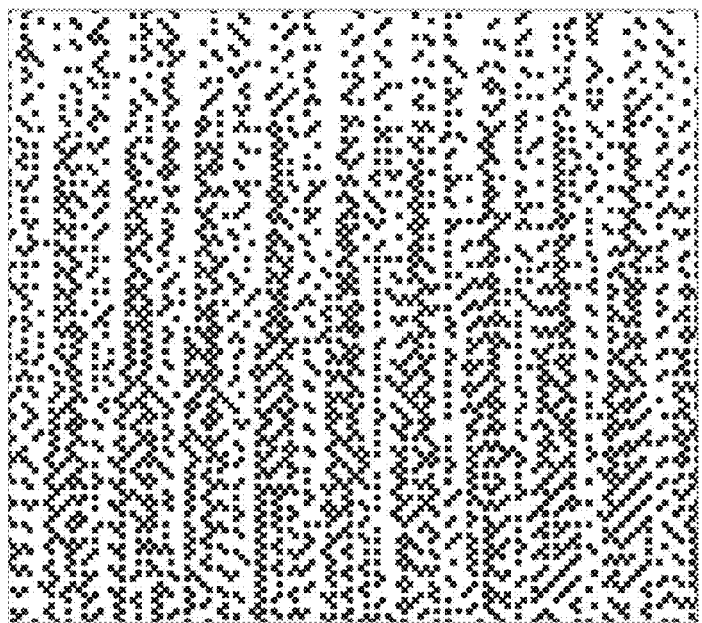
Figure 21:
FIGS. 21-24 illustrate new files/images generated from the images/files of FIGS. 17-20 selecting unique sections/blocks of color pixels (each in an offset checkboard pattern in this example) from each color plate.
Figure 22:
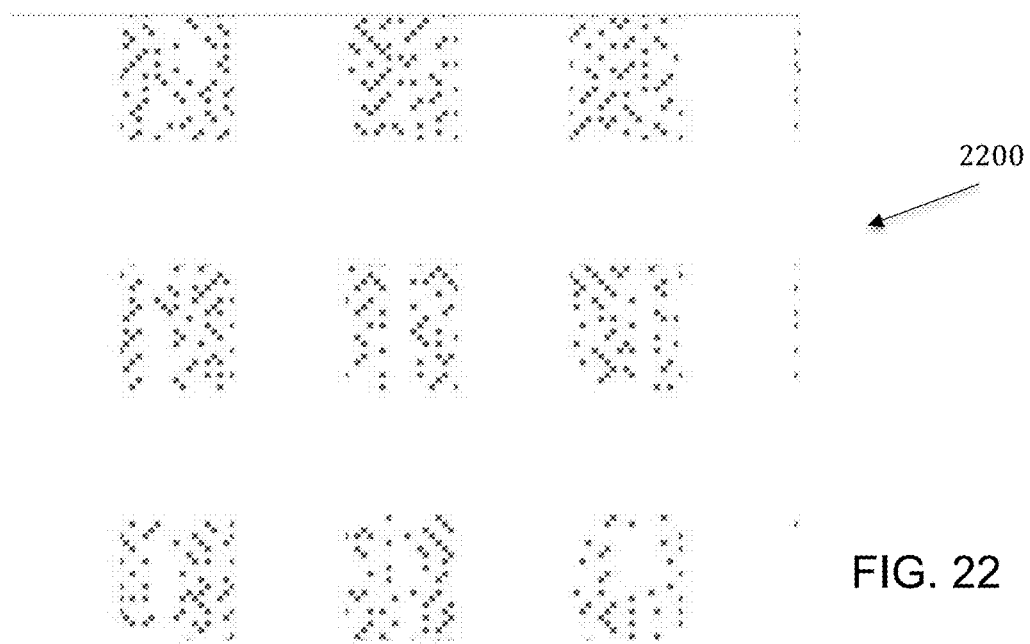
Figure 23:
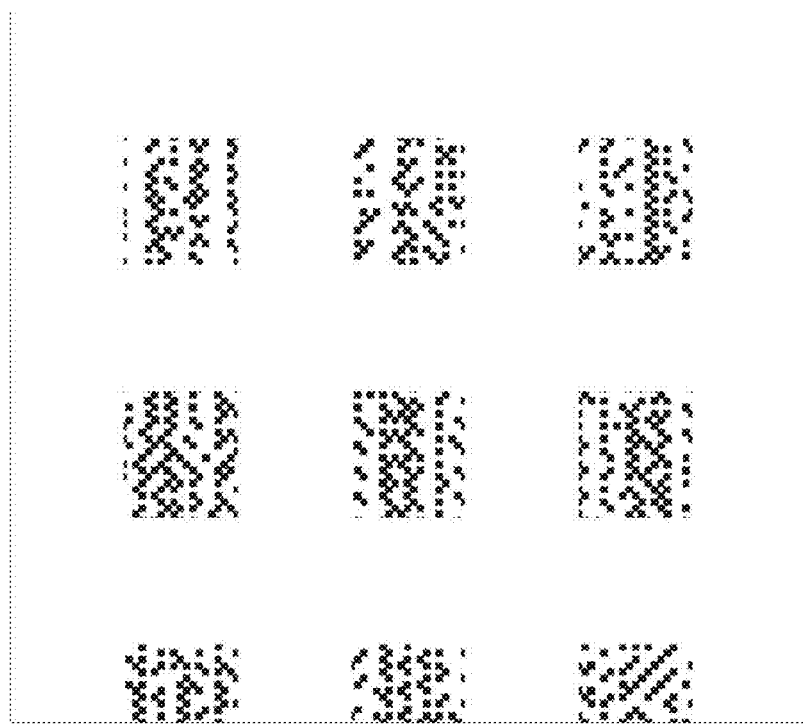
Figure 24:
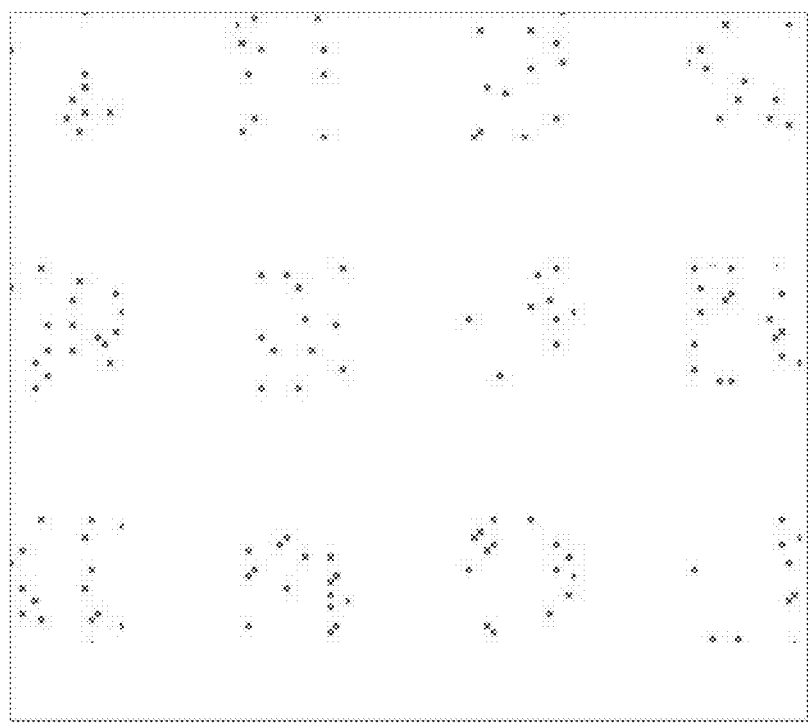

FIG. 15 illustrates an image 1500 that is an enlarged or "zoomed-in" representation of a specific section of the image 1400 (the eyes of the person's face chosen in this example). Further enlargement (or zooming in) on the image 1500 provides the image 1600 of FIG. 16 showing a plurality of dots (or also called pixels herein) of each color from each plate or file output by the RIP/color separation module. Although difficult to see in the black and white FIG. 16, the dots are colored dots such as C, M, Y, and K dots, and the file/image 1600 includes C, M, Y, and K dots (and blank white spaces between the dots) in the correct percentage and locations in the file 1600 to create the different colors from the original images to display the image 1300 when printed under a lens array. The image/file 1600 can be printed with traditional print methods using a plate for each color.

Figure 14:
FIG. 14 provides a representation of the image of FIG. 13 during color separation (e.g., by an RIP or the like)

In the method, the next step may be to complete color separation of the image 1400 of FIG. 14 to obtain a plate or file for each of the four colors. FIGS. 17-20 illustrate, respectively, a first color (cyan or the like) file or plate 1700, a second color (yellow or the like) file or plate 1800, a third color (magenta or the like) file or plate 1900, and a fourth color (black/K or the like) file or plate 2000. Each of the plates 1700, 1800, 1900, and 2000 contains dots for each color of the original interlaced image (along with blank spaces where no color would be printed/displayed). Note, each of FIGS. 17-20 is only a small portion of each file that is largely magnified to allow the viewer to see the dots as a typical file would include a significantly larger number of smaller dots (micron-sized dots/pixels). Each file 1700, 1800, 1900, and 2000 has different percentages or numbers of dots in unique locations that when combined generate all the needed color to display the original image (e.g., full (or at least two) color image 1300 of frame shown in FIG. 13 or the like).

The method of generating a file for a mask and an ink layer/image may then continue with the new software described herein (e.g., the print file generator 920 of FIG. 9) acting to select subsets or sections of the dots/pixels in each color plate 1700, 1800, 1900, and 2000 for use in fabricating an optical display assembly. FIGS. 21-24 illustrate with images 2100, 2200, 2300, and 2400 the set of sections/blocks of exemplary dots/pixels selected from the plates 1700, 1800, 1900, and 2000, respectively. As discussed above, each of these sections or blocks is chosen such that when the four sets of sections/blocks are combined each has its own unique location in a checkerboard-type pattern, and each section/block can be registered to a set of lenses in the lens array (or assigned to the set of lenses for focusing on a particular color).

Figure 25:
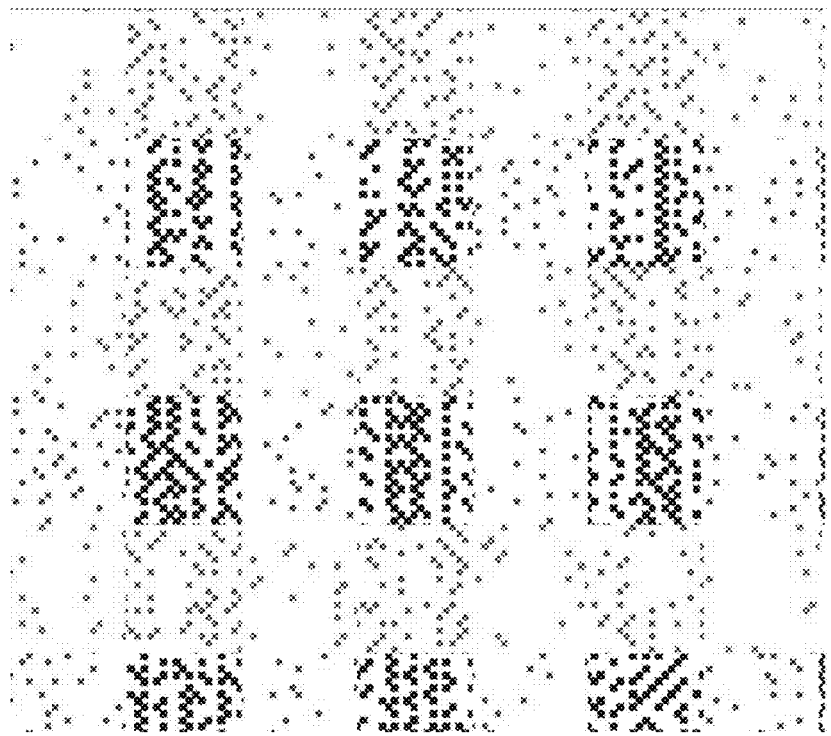
FIG. 25 illustrates a file/image formed by combining the files/images of FIGS. 21-24.

In contrast to the method described above where each of these plates is used in color printing, the color block process/method continues as shown with image 2500 of FIG. 25 with combining the images/files 2100, 2200, 2300, and 2400. Image/file 2500 is a file with the subset of dots/pixels of all four colors in a single file, and each of the blocks/sections of colored dots is in different location/position with a repeating checkboard pattern (e.g., each color set of blocks includes (starting from an upper left corner and continuing on to a lower right corner) a cyan block/section of dots, a magenta block/section of dots, a yellow block of dots, and a black section/block of dots, and such color sets are repeated in each row and column in the pattern of image 2500). Other patterns and arrangements may be used with a goal being to provide equal numbers of dots for each color that are relatively equally spaced about the image 2500 (with equal numbers being assumed by choosing equal sizes for the sections/blocks of each color and equal numbers of sections/blocks for each color in image/file 2500). Each section for each color corresponds to multiple lenses (or a set of lenses from the lens array), which can vary in size/number such 20 lens by 20 lens, 40 lens by 50 lens, or the like or an non-integer number of lenses as discussed above.

Figure 26:
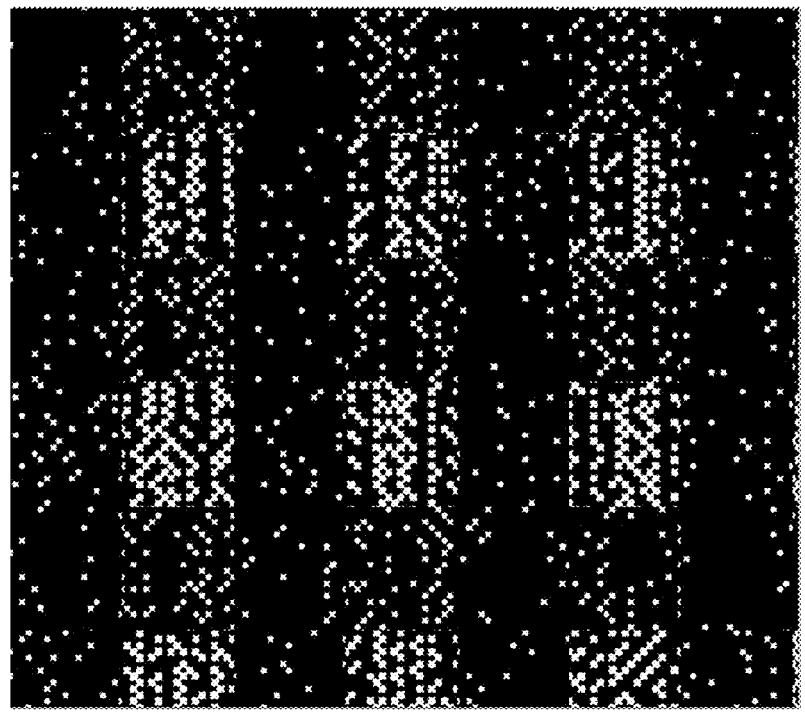
FIG. 26 illustrates a file/image defining a mask design created for the color plates of FIGS. 21-24 by making all non-colored (white) or blank pixels of the image of FIG. 25 opaque.

The method may now continue, after the colored dots/pixels have been separated into blocks or block-shaped sections, with creating another file or digital image. FIG. 26 shows an image 2600 of this file that is made up of all the pixels (or dots) that are blank or absent of any of the colored dots/pixels, i.e., the dots/pixels or spaces shown as being white in image 2500 of FIG. 25. In the image 2600, these pixels are shown as being black to allow the reader to visualize this digital file. The image/file 2600 may be thought of as being very important to the method/fabrication of optical assemblies using a mask and colored block because it contains: (1) interlaced information, meaning pixels from an interlaced image that will create the desired effect (even if a relatively large percentage (e.g., 50 to 75 percent or the like) have been deleted from the first color separation plate for each color of the image); (2) color information, with each section (block) containing the correct percentage and location of color pixels to generate the desired color or tone from the original image; and (3) perfect registration between the sections or blocks (as it is a single file rather than a separate file for each color).

The file/image 2600 is used in the method of fabricating an optical display assembly to produce a mask. The mask can be formed, for example, by using the file/image 2600 and processing a metallized film with a demetallization system, excimer ablation system, or the like such that the mask material has openings or apertures associated with each color pixel in image 2500 (or is at least translucent to light at these locations) and is opaque in non-colored/blank portions of the image 2500. If enough resolution is available, the mask can also be printed with an opaque ink (e.g., a white color) or similar technique to block the needed pixels from showing through from the ink layer/printed image. As discussed above, the mask will be positioned between the lens array and the ink layer/printed image in the optical display assembly, and it is aligned with sets of the lenses in the lens array such that each of these sets focuses on a section of the mask associated with a block/section of color pixels from image 2500 of FIG. 25.

Figure 27:
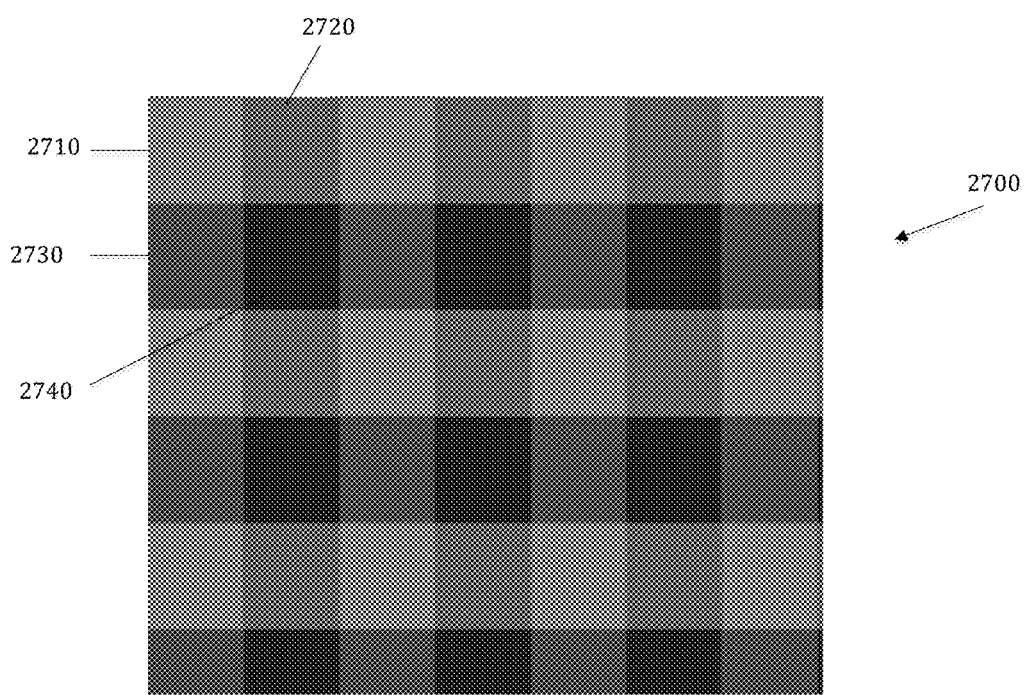
FIG. 27 illustrates a file/image defining an ink layer/printed image for use with the mask of FIG. 26 with a checkboard pattern of four-colored blocks that are registered to the sections/blocks of the image/file of FIG. 25.

The method then continues with printing an ink layer/printed image on the mask or on the substrate such that the mask is sandwiched between the ink layer/printed image and the lens array and such that blocks of each color associated with section/block of color pixels defined by the mask are aligned with or registered to the correct areas of the mask. FIG. 27 shows with image 2700 an exemplary ink layer/printed image 2700 what has color blocks in a checkboard pattern containing the four (in this example) colors of the full color image. For example, the upper left hand corner of image 2700 includes a color set of a cyan color block 2710, a magenta color block 2720, a yellow color block 2730, and a black color block 2740, and such color sets are repeated in each row and column in the ink layer/printed image. Each of the blocks 2710, 2720, 2730, and 2740 is positioned (or printed) under a portion of the mask formed from image 2600 that defines the pixels/dots where the lens of a set of lenses dedicated to that color will focus to display the color imagery in an optical display assembly. Stated differently, each of the blocks of image/file 2700 corresponds in size, shape, and location with one of the sections/blocks of colored pixels/dots in the image 2500 of FIG. 25. In other words, the mask blocks light in the blank/white pixels of image 2500 and allows lens sets over each of the sections/blocks of colored pixels in image 2500 to focus light onto the color blocks of image 2700.

We claim:

1. A lens-based display apparatus useful as an optical security element, comprising:
   a lens array with a first side comprising a plurality of lenses and a second side opposite the first side; and
   a printed interlaced image proximate to the second side of the lens array comprising a first set of pixels of the printed interlaced image formed with a first layer of ink of a first color and a second set of pixels of the printed interlaced image formed with a second layer of ink of a second color applied on the first layer of ink,
   wherein the first set of pixels are located underneath a first set of the lenses of the lens array with differing subsets of the first set of pixels underneath each lens in the first set of the lenses,
   wherein the second set of pixels are located underneath a second set of the lenses of the lens array that differs from the first set of the lenses, with differing subsets of the second set of pixels underneath each lens in the second set of the lenses, and
   wherein the first set of pixels are located at locations under each of the lenses in the first set of the lenses that differ from locations of the second set of pixels under each of the lenses in the second set of the lenses.

2. The apparatus of claim 1, wherein the first set of the lenses are focused on data-absent or blank pixels of the printed image when the second set of the lenses are focused on the second set of pixels.

3. The apparatus of claim 1, wherein the first set of pixels are located in a first set of sections and the second set of pixels are located in a second set of sections and wherein the first and second sets of sections are arranged in first and second patterns that differ and that are configured to position each of the first set of sections under a subset of the first set of the lenses and each of the second set of sections under a subset of the second set of the lenses.

4. The apparatus of claim 3, wherein each of the subsets of the first and second sets of the lenses includes a non-integer number of the lenses.

5. The apparatus of claim 3, wherein the first set of sections are a subset of sections formed by dividing a plate, formed from a digital version of the printed interlaced image, for the first color by a color separation process into a grid and wherein the second set of sections are a subset of sections formed by dividing a plate, formed from the digital version of the printed interlaced image, for the second color by the color separation process into the grid.

6. The apparatus of claim 3, wherein the sections have sides with dimensions chosen such that a color set formed of two of the sections is greater in size than a registration error of a printer used to form the first and second layers of ink.

7. The apparatus of claim 6, wherein the dimensions of the sides are greater than four times the registration error.

8. The apparatus of claim 1, further comprising a substrate, wherein the printed interlaced image is printed upon a surface of the substrate and the substrate is mated with the lens array and wherein the lenses each comprise a linear lens, a round lens, an aspherical lens, a square lens, or a hexagonal lens.

9. A product including the apparatus of claim 1, wherein the product comprises one of currency, a financial card, a patch, a passport, and an authenticity label.

10. An apparatus with an optical display feature, comprising:
 a substrate;
 a layer of ink printed upon a side of the substrate; and
 a lens array attached to the substrate,
 wherein the ink layer comprises pixels of a first color arranged into a plurality of sections arranged in a first pattern and further comprises pixels of a second color arranged into a plurality of sections arranged in a second pattern differing from the first pattern,
 wherein a different set of lenses of the lens array is paired with each of the sections, whereby each of the different sets of lenses are used for focusing on either the pixels of the first color or the pixels of the second color,
 wherein the pixels of the first color are defined by a first plate formed via color separation processes performed on an interlaced image and the pixels of the second color are defined by a second plate formed via the color separation processes performed on the interlaced image, and
 wherein the pixels of the first color are arranged in patterns under each of the lenses paired with the sections of the first pattern that differ from patterns of the pixels of the second color under each of the lenses paired with the sections of the second pattern, whereby each of the lenses in the lens array exclusively focus for a viewer on locations of the pixels of the first color or the pixels of the second color.

11. The apparatus of claim 10, wherein the ink layer further comprises pixels of a third color arranged into a plurality of sections arranged in a third pattern and pixels of a fourth color arranged into a plurality of sections arranged in a fourth pattern and wherein the first, second, third, and fourth patterns differ from each other such that the sections only overlap in the ink layer due to registration error of a printer used to print the ink layer.

12. The apparatus of claim 10, wherein a non-integer number of the lenses of the lens array are provided in each of the sets of the lenses.

13. The apparatus of claim 10, wherein each of the sections overlaps with an adjacent one of the sections in the ink layer by less than 15 percent of a width or height of the section.

14. A lens-based display apparatus useful as an optical security element, comprising:
 a lens array with a first side comprising a plurality of lenses and a second side opposite the first side;
 a printed image comprising blocks formed of ink of a first color and arranged in a first pattern and blocks formed of ink of a second color and arranged in a second pattern differing from the first pattern; and
 a mask proximate to the second side of the lens array and positioned between the printed image and the lens array,
 wherein the mask includes a first set of openings associated with a first set of pixels and a second set of openings associated with a second set of pixels, the mask blocking light received through the lens array except at locations of the openings in the first and second sets of openings through which the light received through the lens array is passed to the blocks of the printed image,
 wherein the first set of openings are arranged into a first set of sections that are arranged in a third pattern matching the first pattern of the blocks,
 wherein the second set of openings are arranged into a second set of sections that are arranged in a fourth pattern matching the second pattern of the blocks,
 wherein the first set of openings are located underneath a first set of the lenses of the lens array, and
 wherein the second set of openings are located underneath a second set of the lenses of the lens array that differs from the first set of the lenses.

15. The apparatus of claim 14, wherein the first set of pixels corresponds with a subset of pixels of a first color plate for an interlaced image and wherein the second set of pixels corresponds with a subset of pixels of a second color plate for the interlaced image.

16. The apparatus of claim 15, wherein the mask includes third and fourth sets of openings associated with third and fourth sets of pixels from third and fourth color plates for the interlaced image, and wherein the printed image further comprises blocks formed of ink of a third color and arranged in a third pattern and blocks formed of ink of a fourth color and arranged in a fourth pattern differing from the first, second, and third patterns.

17. The apparatus of claim 14, further comprising a substrate, wherein the ink layer abuts a surface of the substrate, the substrate is mated with the lens array, and the mask is disposed between the ink layer and the lens array.

18. A product including the apparatus of claim 17, wherein the product comprises one of currency, a financial card, a patch, a passport, and an authenticity label.

19. The apparatus of claim 14, wherein the first and second patterns are selected such that the blocks of the first and second colors of ink are arranged in a repeating pattern of horizontal rows each having alternating colored blocks and with each adjacent pair of the horizontal rows being horizontally offset by one of the colored blocks.

20. The apparatus of claim 14, wherein the mask is formed by demetallization of a metalized film to form the openings.

* * * * *